US 12,045,086 B2

United States Patent
Kim et al.

(10) Patent No.: US 12,045,086 B2
(45) Date of Patent: Jul. 23, 2024

(54) DISPLAY DEVICE

(71) Applicant: LG ELECTRONICS INC., Seoul (KR)

(72) Inventors: Chulki Kim, Seoul (KR); Jaehun Lee, Seoul (KR); Seokhun Na, Seoul (KR); Jonggil Pyo, Seoul (KR); Seunggyu Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 220 days.

(21) Appl. No.: 17/844,664

(22) Filed: Jun. 20, 2022

(65) Prior Publication Data

US 2023/0236625 A1 Jul. 27, 2023

(30) Foreign Application Priority Data

Jan. 24, 2022 (KR) .................. 10-2022-0009664

(51) Int. Cl.
 *H01H 47/00* (2006.01)
 *G06F 1/16* (2006.01)

(52) U.S. Cl.
 CPC .................. *G06F 1/1607* (2013.01)

(58) Field of Classification Search
 None
 See application file for complete search history.

(56) References Cited

U.S. PATENT DOCUMENTS

| 2013/0155655 A1 | 6/2013 | Lee et al. |
| 2016/0212864 A1 | 7/2016 | Lee et al. |
| 2019/0146263 A1* | 5/2019 | Kim ............... G02F 1/133308 |
| | | 361/809 |
| 2021/0141587 A1 | 5/2021 | Cho |
| 2022/0373842 A1* | 11/2022 | Seong ............. G02F 1/133317 |

FOREIGN PATENT DOCUMENTS

JP 2021076838 5/2021

OTHER PUBLICATIONS

European Patent Office Application Serial No. 22172680.5, Search Report dated Nov. 11, 2022, 7 pages.
European Patent Office Application Serial No. 22172680.5, Notice of Allowance dated Sep. 15, 2023, 64 pages.
Japan Patent Office Application No. 2022-098595, Notice of Allowance dated Oct. 17, 2023, 3 pages.

* cited by examiner

*Primary Examiner* — Stephen W Jackson
(74) *Attorney, Agent, or Firm* — LEE, HONG, DEGERMAN, KANG & WAIMEY

(57) ABSTRACT

In a display device whose curvature changes in a horizontal direction, a middle cabinet includes each first middle cabinet positioned on each of a top surface and a bottom surface of a display module, and each second middle cabinet positioned on each of a left surface and a right surface of the display module, and the display module is fixed to the second middle cabinet, and an inner sheet and a cover bottom are coupled to the second middle cabinet to be able to slip in the horizontal direction, so that a constant size of a bezel may be secured without a change in a position of the display module.

15 Claims, 19 Drawing Sheets

(a)

(b)

(a)  (b)

(a)

(b)

(a)  (b)

(a)  (b)

(a)

(b)

(a)

(b)

(a)

(b)

(a)

(b)

(a)

(b)

DISPLAY DEVICE

CROSS-REFERENCE TO RELATED APPLICATION(S)

Pursuant to 35 U.S.C. § 119(a), this application claims the benefit of earlier filing date and right of priority to Korean Patent Application No. 10-2022-0009664, filed on Jan. 24, 2022, the contents of which are hereby incorporated by reference herein in its entirety.

BACKGROUND

Field

The present disclosure relates to a display device having a curved surface structure capable of improving the degree of immersion of a user who views the display device.

Discussion of the Related Art

With the increasing development of information society, the demand for display devices is also increasing in various forms. In response to this trend, various display devices, for example, Liquid Crystal Display (LCD), Field Emission Display (FED), Plasma Display Panel (PDP), an electroluminescent device, etc. have recently been developed.

A liquid crystal panel of the LCD may include a liquid crystal layer, may further include a thin film transistor (TFT) substrate and a color filter substrate that are arranged to face each other on the basis of the liquid crystal panel interposed therebetween, and may display an image using light provided from a backlight unit.

As an example of an electroluminescent device, active-matrix-type organic light emitting display (OLED) devices are commercially available on the market and widely used throughout the world. Since the OLED device is a self-emitting device, the OLED device has no backlight and is advantageous in terms of a response speed and a viewing angle as compared to the LCD, so that the OLED devices are attracting attention as next-generation displays.

As described above, since the OLED device has no backlight, the OLED device can be bent and deformed in shape, resulting in implementation of a curved display module. The curved display module can increase the sense of immersion of a user. However, when a plurality of users simultaneously views the curved display module, the plurality of users may feel inconvenience in viewing images displayed on the curved display as compared to a flat panel display.

SUMMARY

Accordingly, the present disclosure is directed to a display device and a method for controlling the same that substantially obviate one or more problems due to limitations and disadvantages of the related art.

An object of the present disclosure is to provide a display device capable of changing a curvature thereof.

Provided is a display device whose curvature changes in a horizontal direction including a display module for outputting an image, an inner sheet disposed on a rear surface of the display module, a cover bottom disposed on a rear surface of the inner sheet, and a middle cabinet for covering perimeters of the display module, the inner sheet, and the cover bottom and forming a side appearance, wherein the middle cabinet includes each first middle cabinet positioned on each of a top surface and a bottom surface of the display module, and each second middle cabinet positioned on each of a left surface and a right surface of the display module, wherein the display module is fixed to the second middle cabinet, and the inner sheet and the cover bottom are coupled to the second middle cabinet to be able to slip in the horizontal direction.

The display device may further include a long hole extending in a lateral direction and defined in the cover bottom, and a fastener fastened to the long hole to fasten the cover bottom and the inner sheet to each other.

The long hole may be defined adjacent to each of a left end and a right end of the cover bottom.

The second middle cabinet may include a first fastening groove where a lateral end of the inner sheet is inserted, and a second fastening groove where a lateral end of the cover bottom is inserted, and, when the curvature of the display device changes, a position of the inner sheet may be changed in the first fastening groove, and a position of the cover bottom may be changed in the second fastening groove.

The second middle cabinet may include a first rib coupled to a lateral end of the display module, a second rib positioned at the rear of the first rib and defining the first fastening groove with the first rib, and a third rib positioned at the rear of the second rib and defining the second fastening groove with the second rib, and a length of the third rib may be greater than a slip distance of the cover bottom.

The third rib may extend to an upper end and a lower end of the second middle cabinet and overlap the first middle cabinet, and the first middle cabinet may include a groove having a shape corresponding to a shape of the third rib at an end thereof.

The lateral end of the cover bottom may be bent to form a step in a forward direction, and a thickness of the step may correspond to a thickness of the third rib.

The display device may further include a first adhesive tape positioned between the display module and the inner sheet, and a second adhesive tape positioned between the inner sheet and the cover bottom, and shapes of the first adhesive tape and the second adhesive tape may change corresponding to slip amounts of the inner sheet and the cover bottom based on the change in the curvature of the display device.

A thickness of the first adhesive tape may be smaller than a thickness of the second adhesive tape.

The display device may further include a drive IC positioned on the rear surface of the display module, the inner sheet may include a first region protruding in a backward direction at a position corresponding to the drive IC, and a plurality of first holes defined in the first region, and the first holes may extend long in a vertical direction and may be arranged to be spaced apart from each other in the horizontal direction.

When the curvature of the display device changes, a spacing between the first middle cabinet and the second middle cabinet may change.

The first middle cabinet may be fastened with the inner sheet.

The first middle cabinet may include an exposed portion exposed on a lateral perimeter of the cover bottom, and a fastening portion extending inwardly from the exposed portion and including a first hook, and the inner sheet may include a second hook coupled with the first hook at an upper end.

The display device may further include a bending module located at a center of a rear surface of the cover bottom, a pair of links respectively extending in left and right directions, wherein each link has one end coupled to the bending module, and a pair of link brackets respectively positioned at left and right ends of the cover bottom, wherein the other end of the link is connected to each link bracket, and, when an angle between the pair of links is changed, curvatures of the display module, the inner sheet, and the cover bottom may be changed.

The display module may include an organic light emitting diode panel.

The display device of the present disclosure may deform the display module into the flat state or the bent state, so that the user may use the display device in a desired shape.

It is possible to provide the display device that includes the inner sheet to secure the rigidity while being bendable and is effective in terms of the heat dissipation.

In particular, it is possible to secure the constant size of the bezel without the change in the position of the display module located at the end of the display device.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

Figure 1:
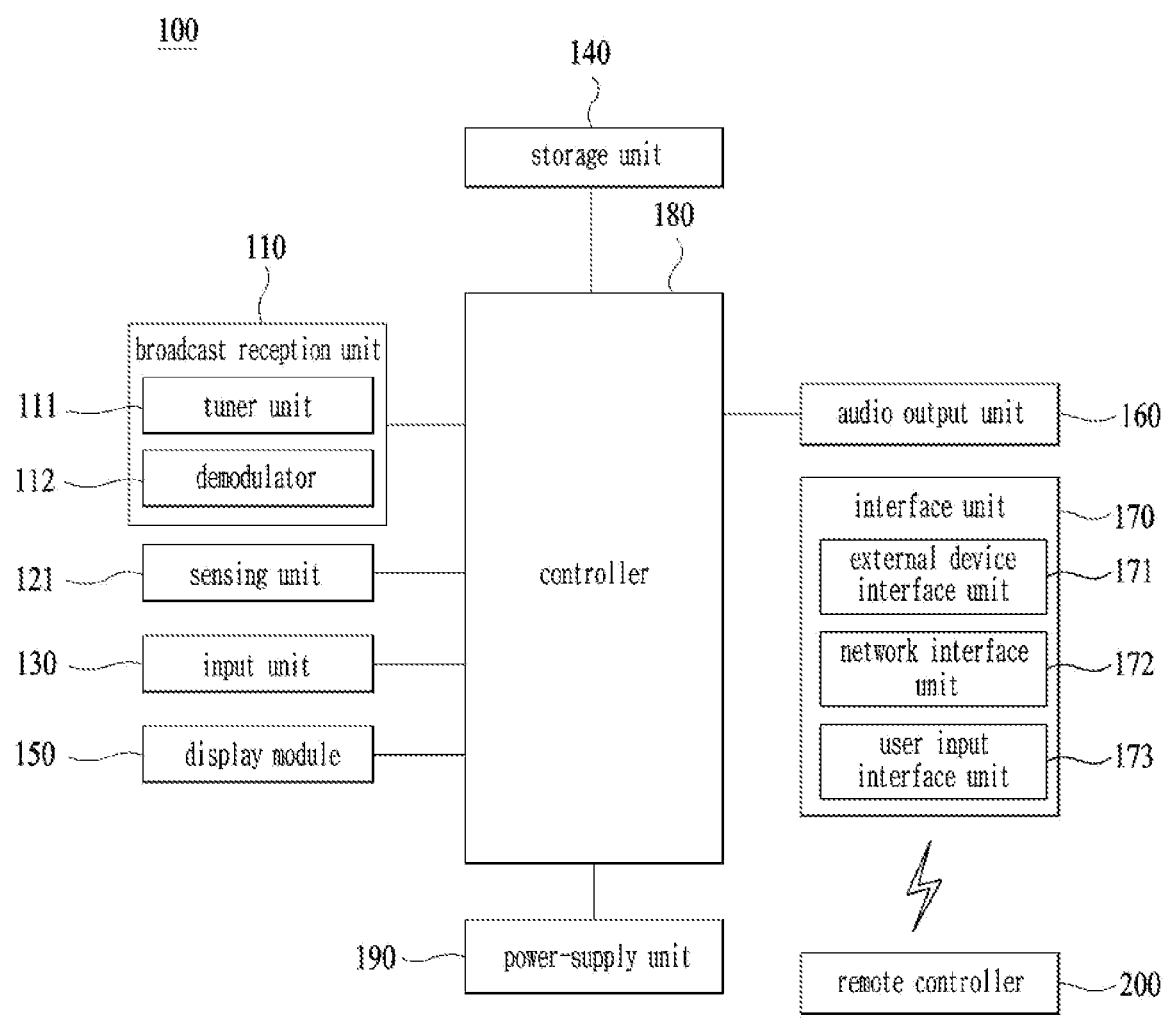
FIG. 1 is a block diagram illustrating constituent elements of a display device according to an embodiment of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

On the other hand, the image display device described herein is, for example, an intelligent image display device implemented by adding a computer support function to a broadcast reception function, and further includes an Internet function or the like while sufficiently performing the broadcast reception function, so that the image display device may have user-friendly interfaces such as a handwriting input device, a touchscreen, or a spatial remote controller. Further, the image display device can support a wired or wireless Internet function by connecting to the Internet and a computer device, thereby performing e-mailing, web browsing, banking, or gaming. To implement these functions, the image display device may operate based on a standard general-purpose Operating System (OS).

Accordingly, the image display device according to the present disclosure is designed in a manner that various applications can be easily added to or deleted from a general-purpose OS kernel so that the image display device can perform various user-friendly functions. The image display device may be, for example, a network TV, a Hybrid broadcast broadband TV (HBBTV), a smart TV, etc. The image display device is applicable to a smartphone as needed.

FIG. 1 is a block diagram illustrating constituent elements of a display device 100 according to an embodiment of the present disclosure. Referring to FIG. 1, the display device 100 may include a broadcast reception unit 110, an external device interface unit 171, a network interface unit 172, a storage unit 140, a user input interface unit 173, an input unit 130, a controller 180, a display 150, an audio output unit 160, and/or a power-supply unit 190.

The broadcast reception unit 110 may include a tuner unit 111 and a demodulator 112.

Although not shown in the drawings, the display device 100 may include only the external device interface unit 171 and the network interface unit 172 from among the broadcast reception unit 110, the external device interface unit 171, and the network interface unit 172. That is, the display device 100 may not include the broadcast reception unit 110.

The tuner unit 111 may select a broadcast signal corresponding to either a user-selected channel or all prestored channels from among broadcast signals received through an antenna (not shown) or a cable (not shown). The tuner unit 111 may convert the selected broadcast signal into an intermediate frequency (IF) signal or a baseband image or a voice signal.

For example, when the selected broadcast signal is a digital broadcast signal, the tuner unit 111 may convert the selected broadcast signal into a digital IF (DIF) signal. When the selected broadcast signal is an analog broadcast signal, the tuner unit 111 may convert the selected broadcast signal into an analog baseband image or a voice signal (CVBS/SIF). That is, the tuner unit 111 may process the digital broadcast signal or the analog broadcast signal. The analog baseband image or the voice signal (CVBS/SIF) output from the tuner unit 111 may be directly input to the controller 180.

The tuner unit 111 may sequentially select broadcasting signals of all broadcasting channels stored through a channel memory function from among the received broadcast signals, and may convert the selected broadcast signal into an intermediate frequency (IF) signal or a baseband image or a voice signal.

The tuner unit 111 may include a plurality of tuners to receive broadcast signals of the plurality of channels. Alternatively, a single tuner for simultaneously receiving broadcast signals of the plurality of channels is also possible.

The demodulator 112 may receive the digital IF signal (DIF) converted by the tuner unit 111, and may thus perform demodulation of the received signal. The demodulator 112 may perform demodulation and channel decoding, and may output a stream signal (TS). The stream signal may be a signal formed by multiplexing an image signal, a voice signal, or a data signal.

The stream signal (TS) output from the demodulator 112 may be input tio the controller 180. The controller 180 may perform demultiplexing, image/audio signal processing, etc., may output an image through the display 150, and may output a voice through the audio output unit 160.

The sensing unit 120 may sense a change in the display device 100 or may sense an external change. For example, the sensing unit 120 may include a proximity sensor, an illumination sensor, a touch sensor, an infrared (IR) sensor, an ultrasonic sensor, an optical sensor (e.g., a camera), a voice sensor (e.g., a microphone), a battery gauge, environmental sensors (e.g., hygrometer, a thermometer, etc.).

The controller 180 may check a state of the display device 100 based on information collected by the sensing unit 120, may notify the user of a problem, or may control the display device 100 to be kept in the best state.

In addition, it is possible to provide an optimal viewing environment by differently controlling the content, image quality, size, etc. of the image provided to the display module 180 depending on the viewer, ambient illuminance, etc. sensed by the sensing unit. As the smart TV has evolved, the number of functions mounted in the display device increases, and the number of the sensing units 20 also increases together with the increasing functions.

The input unit 130 may be provided at one side of a main body of the display device 100. For example, the input unit 130 may include a touch pad, a physical button, and the like. The input unit 130 may receive various user commands related to the operation of the display device 100, and may transmit a control signal corresponding to the input command to the controller 180.

Recently, as a bezel of the display device 100 decreases in size, the number of display devices 100 each including a minimum number of input unit 130 formed in a physical button exposed to the outside is rapidly increasing. Instead, a minimum number of physical buttons may be provided on the back or side surface of the display device 100. The display device may receive a user input through the remote controller 200 through a touchpad or a user input interface unit 173 to be described later.

The storage unit 140 may store a program for processing and controlling each signal used in the controller 180, and may store a signal-processed image, a voice, or a data signal. For example, the storage unit 140 may store application programs designed for the purpose of performing various tasks that can be processed by the controller 180, and may selectively provide some of the stored application programs upon request of the controller 180.

The program stored in the storage unit 140 is not specifically limited to being executed by the controller 180. The storage unit 140 may perform a function for temporarily storing an image, a voice, or a data signal received from an external device through the external device interface unit 171. The storage unit 140 may store information about a predetermined broadcast channel through a channel memory function such as a channel map.

Although the storage unit 140 of FIG. 1 is provided separately from the controller 180, the scope of the present disclosure is not limited thereto, and the storage unit 140 may also be included in the controller 180 as needed.

The storage unit 140 may include at least one of a volatile memory (e.g., DRAM, SRAM, SDRAM, etc.) and a non-volatile memory (e.g., flash memory, hard disk drive (HDD), solid state drive (SSD), etc.).

The display 150 may generate a drive signal by converting an image signal, a data signal, an OSD signal, a control signal processed by the controller 180, or by converting an image signal, a data signal, a control signal, etc. received from the interface unit 171. The display 150 may include a display panel 181 having a plurality of pixels.

A plurality of pixels included in the display panel may include RGB sub-pixels. Alternatively, a plurality of pixels included in the display panel may include sub-pixels of RGBW. The display 150 may convert the image signal, the data signal, the OSD signal, the control signal, etc. processed by the controller 180 to generate a drive signal for the plurality of pixels.

The display 150 may be implemented as a plasma display panel (PDP), a liquid crystal display (LCD), an organic light emitting diode (OLED), a flexible display, etc. In addition, the display 150 may also be implemented as a three-dimensional (3D) display. The three-dimensional (3D) display 150 may be classified into a glassless-type 3D display and a glasses-type 3D display.

The display device may include a display module that occupies most parts of the front surface, and a case that covers the back and side surfaces of the display module and packages the display module.

Recently, the display device 100 has evolved from a flat-screen display to a curved-screen display. In order to implement the curved screen, the display device 100 may use a display module 150 that can be bent or curved, such as a light emitting diode (LED) or an organic light emitting diode (OLED), etc.

Conventionally, the LCD has difficulty in self-emitting light, so that the conventional LCD has been designed to receive light through a backlight unit. The backlight unit is a device for uniformly supplying light received from a light source to a liquid crystal located on the front surface of the display device. As the backlight becomes thinner, a thin LCD can be implemented. However, it is actually difficult for the backlight unit to be implemented as a curved structure formed of a flexible material. Although the backlight unit is implemented as a curved shape, it is difficult for light to be uniformly applied to the liquid crystal, thereby changing brightness of the screen.

On the other hand, the LED or the OLED is designed in a manner that each of constituent elements constructing the pixels can self-emit light without using the backlight unit, so that the LED or the OLED can be implemented as a curved shape without any problems. In addition, since each element can perform self-emission of light, brightness of each element is not affected by a change in the positional relationship between the element and adjacent elements, so that a curved display module 150 can be implemented as an LED or OLED.

OLED (Organic Light Emitting Diode) panels appeared in earnest in mid-2010 and are rapidly replacing LCDs in the small- and medium-sized display market. The OLED is a display made using the self-emission characteristics in which OLED emits light when a current flows in a fluorescent organic compound. Since the response speed of the OLED is faster than that of the LCD, there is little afterimage when moving images are implemented.

OLEDs may be used as a light-emitting display product. In this case, the light-emitting display device may use three fluorescent organic compounds (such as red, green, and blue) each having a self-emitting function, and may use the self-emitting phenomenon in which positive(+)-charged particles and electrons injected from a cathode and anode are combined with each other within the organic material, so that a backlight unit causing degradation of color sense need not be used.

The LED panel is implemented by technology for using only one LED element as one pixel, and has a smaller LED element compared to the prior art, so that a curved display module 150 can be implemented. Whereas the conventional device referred to as an LED TV can use the LED as a light source of the backlight unit for supplying light to the LCD, it is impossible for the LED of the conventional device to constitute a screen.

The display module may include a display panel, a coupling magnet located on the rear surface of the display panel, a first power-supply unit, and a first signal module. The display panel may include a plurality of pixels (R, G, B). The plurality of pixels (R, G, B) may be formed in each region where a plurality of data lines and a plurality of gate lines cross each other. The plurality of pixels (R, G, B) may be arranged in a matrix.

For example, the plurality of pixels (R, G, B) may include a red (R) sub-pixel, a green (G) sub-pixel, and a blue (B) sub-pixel. The plurality of pixels (R, G, B) may further include white (W) sub-pixel(s).

In the display module 150, one side where an image is displayed may be referred to as a front side or a front surface. When the display module 150 displays an image, one side where no image is observed may be referred to as a rear side or a rear surface.

Meanwhile, the display 150 may be implemented as a touchscreen, so that the display 150 can also be used as an input device in addition to an output device.

The audio output unit 160 may receive a voice-processed signal from the controller 180, and may output the received signal as a voice signal.

The interface unit 170 may serve as a path of connection to various kinds of external devices connected to the display device 100. The interface unit may include not only a wired method for transmitting/receiving data through a cable, but also a wireless method using the antenna.

The interface unit 170 may include at least one of a wired/wireless headset port, an external charger port, a wired/wireless data port, a memory card port, a port connected to a device having an identification module, an audio input/output (I/O) port, a video I/O port, and an earphone port.

As an example of a wireless method, the above-described broadcast reception unit 110 may be used. The broadcast reception unit 110 may be configured to use a broadcast signal, a mobile communication short-range communication signal, a wireless Internet signal, and the like.

The external device interface unit 171 may transmit or receive data to and from a connected external device. To this end, the external device interface unit 171 may include an A/V input/output (I/O) unit (not shown).

The external device interface unit 171 may be wired or wirelessly connected to an external device such as a digital versatile disc (DVD) player, a Blu-ray player, a game console, a camera, a camcorder, a computer (laptop), a set-top box, or the like, and may perform an input/output (I/O) operation with the external device.

In addition, the external device interface unit 171 may establish a communication network with various remote controllers 200, may receive a control signal related to operation of the display device 100 from the remote controller 200, or may transmit data related to operation of the display device 100 to the remote controller 200.

The external device interface unit 171 may include a wireless communication unit (not shown) for short-range wireless communication with other electronic devices. Through the wireless communication unit (not shown), the external device interface unit 171 may exchange data with an adjacent mobile terminal. In particular, the external device interface unit 171 may receive device information, application information, an application image, and the like from the mobile terminal in a mirroring mode.

The network interface unit 172 may provide an interface for connecting the display device 100 to a wired/wireless network including the Internet network. For example, the network interface unit 172 may receive content or data provided by the Internet, a content provider, or a network administrator through a network. The network interface unit 172 may include a communication module (not shown) for connection with the wired/wireless network.

The external device interface unit 171 and/or the network interface unit 172 may include a communication module for short-range communication such as Wi-Fi, Bluetooth, Bluetooth low energy (BLE), ZigBee, Near Field Communication (NFC), and a communication module for cellular communication such as Long-Term Evolution (LTE), LTE-A (LTE Advanced), Code Division Multiple Access (CDMA), WCDMA (wideband CDMA), UMTS (universal mobile telecommunications system), WiBro (Wireless Broadband), etc.

The user input interface unit 173 may transmit user input signals to the controller 180, or may transmit signals received from the controller 180 to the user. For example, the user input interface unit 173 may transmit or receive user input signals (such as a power-on/off signal, a channel selection signal, and a screen setting signal) to and from the remote controller 200, may transmit user input signals received through a local key (not shown) such as a power key, a channel key, a volume key, and a setting key to the controller 180, may transmit a user input signal received by a sensor unit (not shown) for sensing a user gesture to the controller 180, or may transmit a signal received from the controller 180 to the sensor unit.

The controller 180 may include at least one processor, and may control the overall operation of the display device 100 using the processor included therein. Here, the processor may be a general processor such as a CPU. Of course, the processor may be a dedicated device such as an ASIC, or other hardware-based processor.

The controller 180 may demultiplex the stream received through the tuner unit 111, the demodulator 112, the external device interface unit 171, or the network interface 172, and may process the demultiplexed signals to generate and output a signal for image or voice output.

The image signal processed by the controller 180 may be input to the display 150 and displayed as an image corresponding to the corresponding image signal. In addition, the image signal processed by the controller 180 may be input to the external output device through the external device interface unit 171.

The voice (or audio) signal processed by the controller 180 may be audibly output to the audio output unit 160. In addition, the voice signal processed by the controller 180 may be input to the external output device through the external device interface unit 171. Although not shown in FIG. 2, the controller 180 may include a demultiplexer, an image processor, and the like, and a detailed description thereof will hereinafter be described with reference to FIG. 3.

In addition, the controller 180 may control the overall operation of the display device 100. For example, the controller 180 may control the tuner unit 111 to select a broadcast program corresponding to either a user-selected channel or a prestored channel.

In addition, the controller 180 may control the display device 100 by a user command or an internal program received through the user input interface unit 173. The controller 180 may control the display 150 to display an image. In this case, the image displayed on the display 150 may be a still image or a moving image, and may be a 2D image or a 3D image.

On the other hand, the controller 180 may display a predetermined 2D object in the image displayed on the display 150. For example, the object may be at least one of a connected web screen (newspaper, magazine, etc.), electronic program guide (EPG), various menus, widgets, icons, still images, moving images, and text.

Meanwhile, the controller 180 may modulate and/or demodulate the signal using an amplitude shift keying (ASK) scheme. Here, the ASK scheme may refer to a method for modulating a signal by differentiating the amplitude of a carrier wave according to data values or for restoring an analog signal to a digital data value according to the amplitude of the carrier wave.

For example, the controller 180 may modulate an image signal using the ASK scheme, and may transmit the modulated signal through a wireless communication module.

For example, the controller 180 may demodulate and process the image signal received through the wireless communication module using the ASK scheme.

Accordingly, the display device 100 may simply transmit and receive signals to and from other image display devices arranged adjacent to each other without using either a unique identifier such as a Media Access Control (MAC) address or a complex communication protocol such as TCP/IP.

On the other hand, the display device 100 may further include a photographing unit (not shown). The photographing unit may photograph a user. The photographing unit may be implemented as one camera, but is not limited thereto, and may be implemented by a plurality of cameras. On the other hand, the photographing unit may be embedded in the display device 100 or may be separately arranged on the display 150. The image information photographed by the photographing unit may be input to the controller 180.

The controller 180 may recognize the position of the user based on the image photographed by the photographing unit. For example, the controller 180 may recognize a distance (z-axis coordinates) between the user and the display device 100. In addition, the controller 180 may recognize the X-axis coordinate and the Y-axis coordinate within the display 150 corresponding to the user position.

The controller 180 may sense a user gesture based on an image photographed by the photographing unit, each of signals detected by the sensor unit, or a combination thereof.

The power-supply unit 190 may supply corresponding power to the display device 100. In particular, the controller 180 may be implemented as a System on Chip (SoC), a display 150 for displaying an image, and an audio output unit 160 for audio output.

Specifically, the power-supply unit 190 may include a converter (not shown) for converting AC power into DC power, and a DC/DC converter (not shown) for converting the level of DC power.

On the other hand, the power-supply unit 190 may receive power from the external power source, and may distribute the received power to the respective components. The power-supply unit 190 may be directly connected to the external power source to supply AC power, and may include a battery capable of being charged with electricity.

In the former case, the power-supply unit 190 may be used by connecting to a wired cable, and it is difficult for the power-supply unit 190 to move from one place to another place, and the movement range of the power-supply unit 190 is limited. In the latter case, the power-supply unit 190 can move from one place to another place, but the weight and volume of the power-supply unit 190 may increase as much as the weight and volume of the battery. In addition, for charging, the power-supply unit 190 should be directly connected to a power cable for a predetermined period of time or should be coupled to a charging cradle (not shown) for power supply.

The charging cradle may be connected to the display device through a terminal exposed to the outside. Alternatively, if the power-supply unit 190 approaches the charging cradle using a wireless interface, a built-in battery of the power-supply unit 190 may also be charged with electricity.

The remote controller 200 may transmit a user input to the user input interface unit 173. To this end, the remote controller 200 may use Bluetooth, Radio Frequency (RF) communication, infrared (IR) communication, Ultra-Wideband (UWB), ZigBee, or the like. In addition, the remote controller 200 may receive the image, voice, or data signal output from the user input interface unit 173, and may display or audibly output the received image, voice, or data signal.

On the other hand, the above-described display device 100 may be a fixed or mobile digital broadcast receiver capable of receiving digital broadcast signals.

Meanwhile, the block diagram of the display device 100 shown in FIG. 1 is disclosed for only for illustrative purposes for one embodiment of the present disclosure, and the respective components of the display device 100 shown in FIG. 1 can be integrated, added or omitted according to the specifications of the digital device 100 which is actually implemented.

That is, if necessary, two or more components may be combined into one component, or one component may be subdivided into two or more components. In addition, the functions performed in each block are intended to explain the embodiment of the present disclosure, and the specific operation or device does not limit the scope of the present disclosure.

Figure 2:
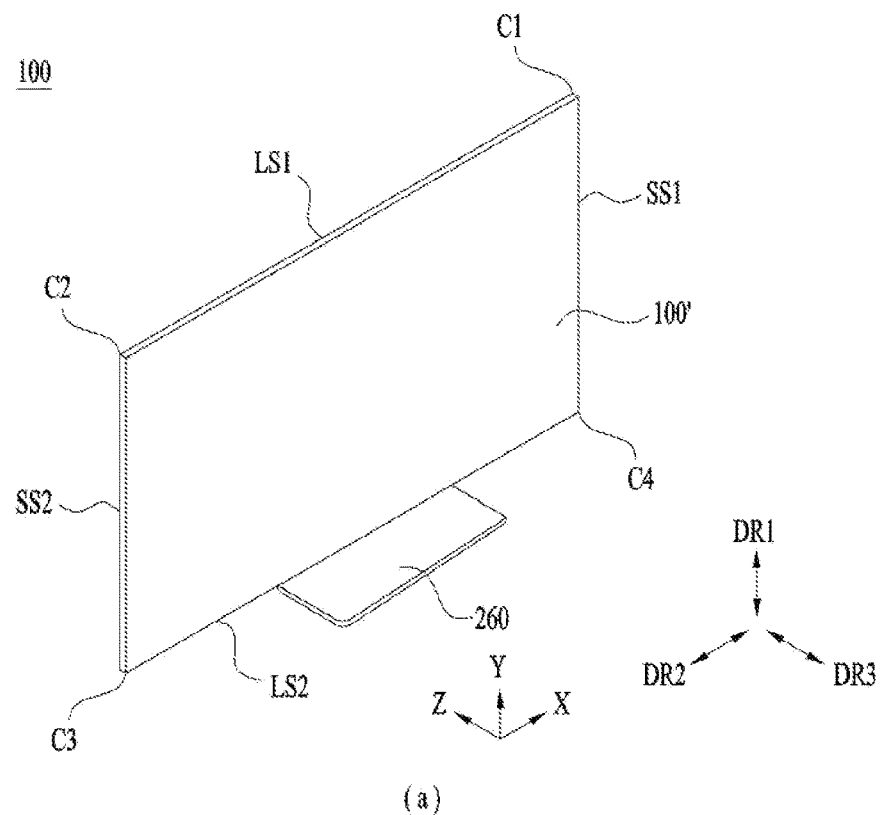
FIG. 2 is a perspective view illustrating an example of a display device according to an embodiment of the present disclosure.
Figure 2:
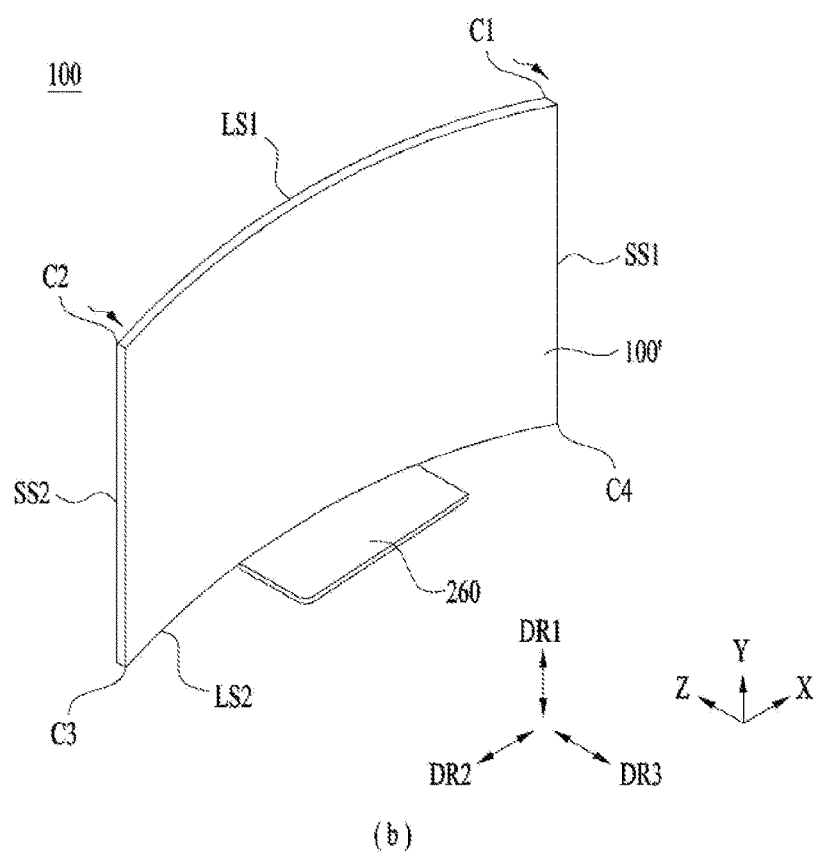

FIG. 2 is a perspective view illustrating an example of the display device according to an embodiment of the present disclosure.

Referring to FIG. 2, the display device 100 may have a rectangular body 100' including a first long side (LS1), a second long side (LS2) facing the first long side (LS1), a first short side (SS1) adjacent to the first long side (LS1) and the second long side (LS2), and a second short side (SS2) facing the first short side (SS1).

Here, the first short side area (SS1) is referred to as a first side area. The second short side area (SS2) is referred to as a second side area facing the first side area. The first long side area (LS1) is referred to as a third side area that is adjacent to the first side area and the second side area while being disposed between the first side area and the second side area. The second long side area (LS2) is referred to as a fourth side area that is adjacent to the first side area and the second side area while being disposed between the first side area and the second side area.

In addition, although the length of the first and second long sides LS1 and LS2 is longer than the length of the first and second short sides SS1 and SS2 as shown in FIG. 2, the scope of the present disclosure is not limited thereto, and the length of the first and second long sides LS1 and LS2 may also be approximately the same as the length of the first and second short sides SS1 and SS2 as needed.

In addition, the first direction (DR1) may be a direction parallel to each of the long sides LS1 and LS2 of the display device 100, and the second direction (DR2) may be a direction parallel to each of the short sides SS1 and SS2 of the display device 100. The third direction (DR3) may be a direction perpendicular to the first direction (DR1) and/or the second direction (DR2).

From another point of view, the side where the display device 100 displays an image may be referred to as a front side or a front surface. When the display device 100 displays an image, the side where no image is observed may be referred to as a back side or a back surface. When the display device 100 is viewed from the front side or the front surface, the first long side (LS1) may be referred to as an upper side or an upper surface. Similarly, the second long side (LS2) may be referred to as a lower side or a lower surface. Similarly, the first short side (SS1) may be referred to as a right side or a right surface, and the second short side (SS2) may be referred to as a left side or a left surface.

In addition, the first long side (LS1), the second long side (LS2), the first short side (SS1), and the second short side (SS2) may be referred to as an edge of the display device 100. A point where the first long side (LS1), the second long side (LS2), the first short side (SS1), and the second short side (SS2) meet each other may be referred to as a corner. For example, a point where the first long side (LS1) and the first short side (SS1) meet each other may be referred to as a first corner (C1). A point where the first long side (LS1) and the second short side (SS2) meet each other may be referred to as a second corner (C2). A point where the second short side (SS2) and the second long side (LS2) meet each other may be referred to as a third corner (C3). A point where the second long side (LS2) and the first short side (SS1) meet each other may be referred to as a fourth corner (C4).

Here, the direction from the first short side (SS1) to the second short side (SS2) or the direction from the second short side (SS2) to the first short side (SS1) may be referred to as a horizontal direction (LR). The direction from the first long side (LS1) to the second long side (LS2) or from the second long side (LS2) to the first long side (LS1) may be referred to as a vertical direction (UD).

The display device 100 according to the present disclosure may change the shape of the display module 150 using the LED or OLED instead of a liquid crystal, as shown in FIG. 2(*a*) or FIG. 2(*b*). That is, the backlight unit may be omitted, and the display device can be changed in shape within a predetermined range, so that the curved display device 100 can be implemented as shown in FIG. 2(*b*) using the above-described characteristics.

The display device 100 according to the present disclosure is a variable display device 100 in which a user can adjust a curvature according to a situation, rather than a curved display device fixed in a curved state. The display device 100 may further include a curvature adjustment unit capable of changing a curvature of the main body 100' configured to include the display module 150.

Figure 3:
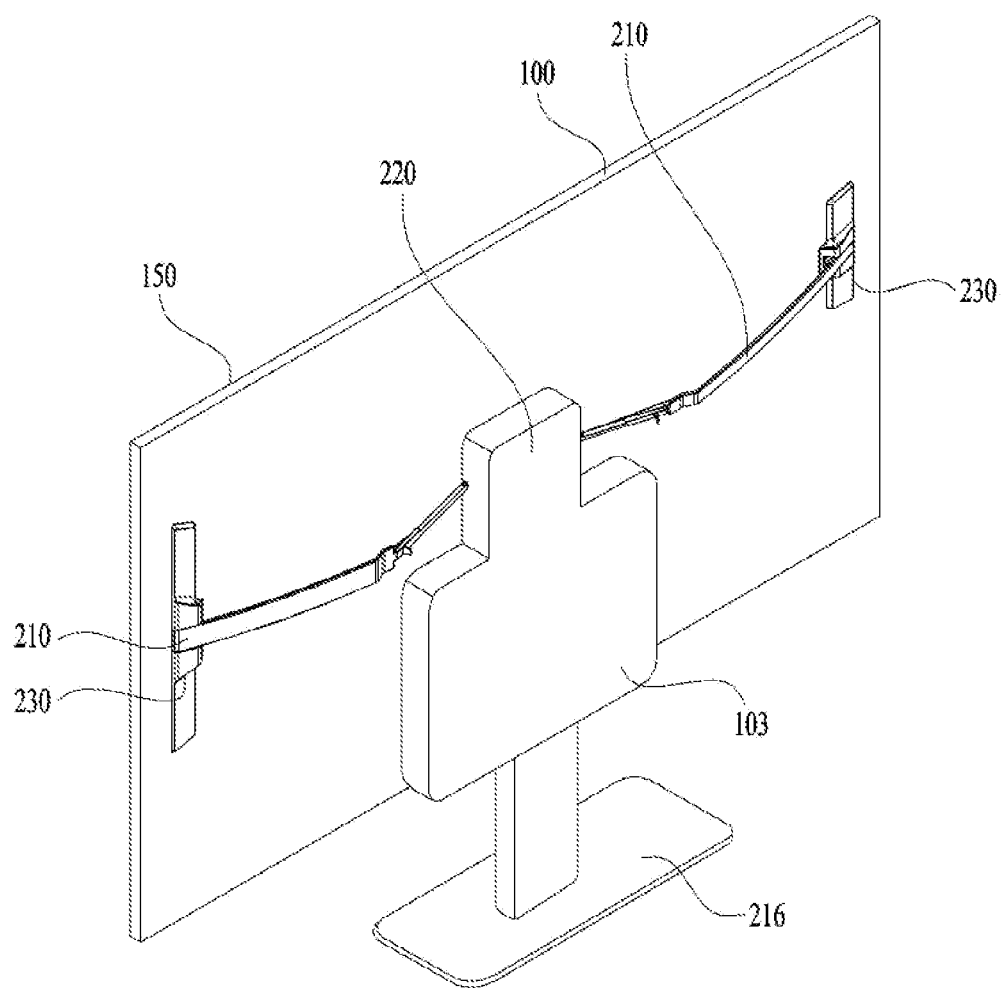
FIG. 3 is a rear view illustrating a display device according to an embodiment of the present disclosure.
Figure 4:
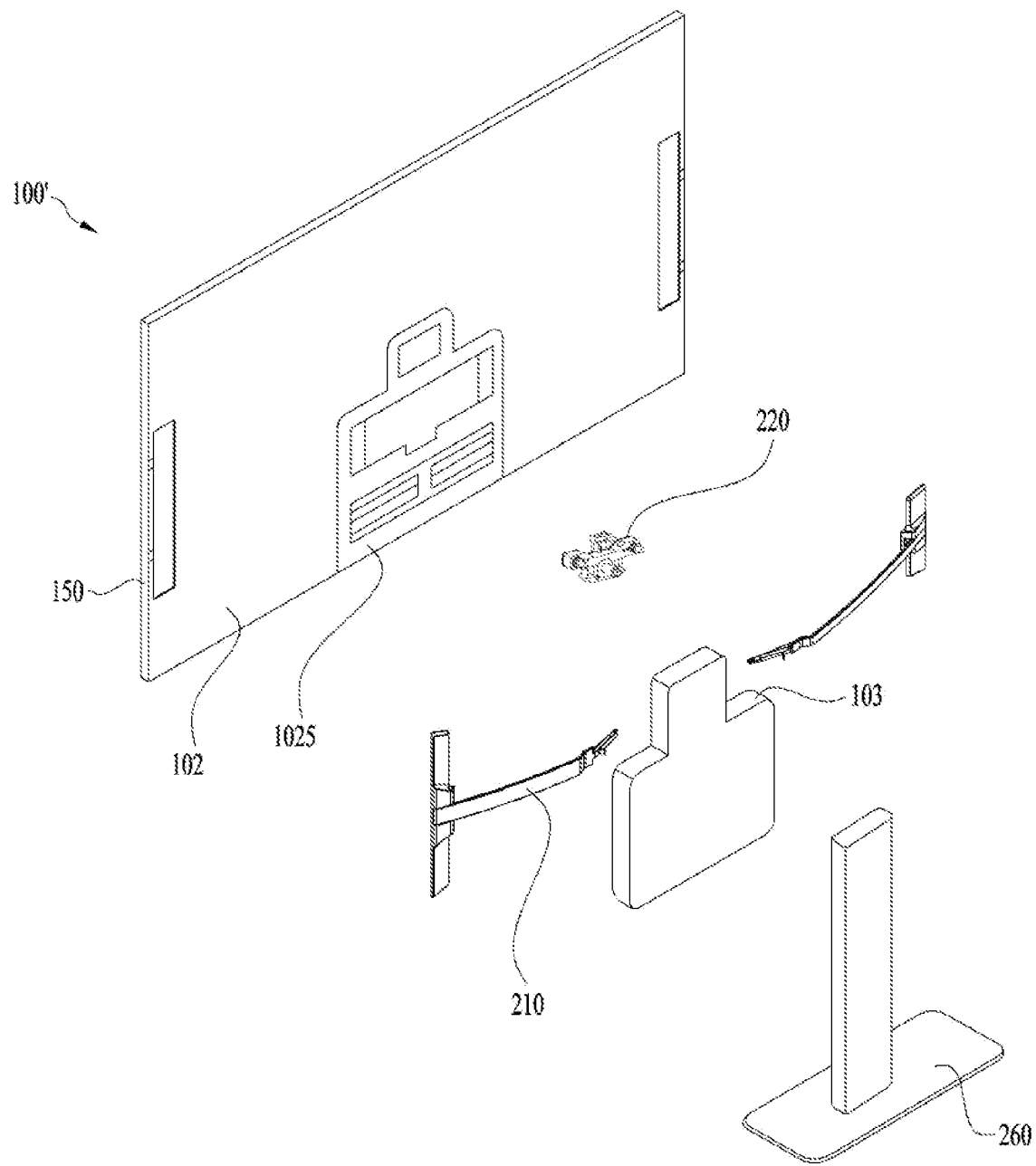
FIG. 4 is an exploded perspective view illustrating a display device according to an embodiment of the present disclosure.

FIG. 3 is a rear view illustrating the display device 100 according to an embodiment of the present disclosure. FIG. 4 is an exploded perspective view illustrating the display device 100 according to an embodiment of the present disclosure. Referring to FIGS. 3 and 4, the display device 100 may include a main body 100', a stand 260 for mounting the main body 100' on the floor, a controller 180, and curvature adjustment units 210, 220, and 230.

The main body 100' including the display module 150 may include a cover bottom 102 that covers a back surface of the display module 150 to which an image is output. A heat dissipation structure for discharging heat generated by the display module 150 may be provided at the inner surface of the cover bottom 102, and the main body 100' may further include a reinforcing material for reinforcing rigidity.

The cover bottom 102 may cover the back surface of the display module 150, may reinforce the rigidity of the display module 150, and may protect the back surface of the display module 150. In particular, the display module 150 may cover a driving IC of the display extending in a backward direction of the display module 150. A main substrate may be mounted on the back surface of the cover bottom 102 as a controller for controlling the display module 150, and a hole may be formed in the cover bottom 102 to interconnect the main substrate and the driving IC of the display module 150.

A separate bracket 1025 may be further provided so that the controller 180, such as a main board, can be mounted thereto. The display device 100 according to the present disclosure may further include a curvature adjustment unit for changing the curvature of the main body 100' other than the controller for controlling the display module 150 on the back surface of the cover bottom 102.

The curvature adjustment unit may further include a pair of links 210, a bending module 220 located at the center of the display device 100 and coupled to one end of the pair of links 210, and a pair of link brackets 230 disposed between the other end of the pair of links 210 and the cover bottom 102.

Figure 5:
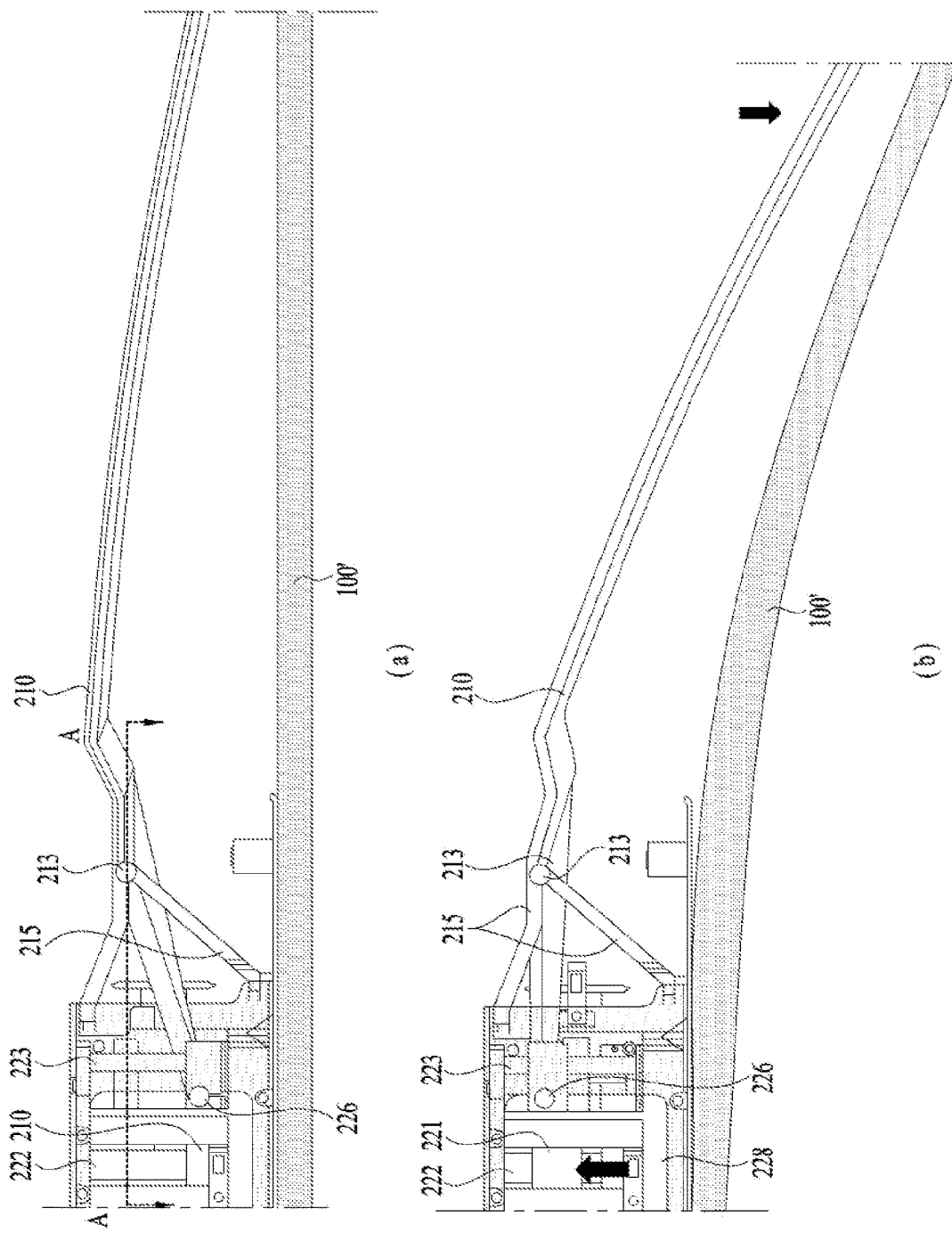
FIG. 5 is a top view illustrating a display device according to an embodiment of the present disclosure.

FIG. 5 is a top view illustrating the display device 100 according to an embodiment of the present disclosure. As shown in FIGS. 5(a) and 5(b), the curvature of the display device 100 may be changed according to the angle formed by the pair of links 210. The angle of the pair of links 210 may be adjusted according to a change in the position of the moving block 221 of the bending module 220.

The other end of the pair of links 210 may be slidably coupled to the link bracket 230. When the link bracket 230 is fixed to the link bracket 230, the curvature of the display module 150 is large at the end thereof so that it is difficult to implement a natural curved surface of the display module 150.

Accordingly, if the angle of the pair of links 210 is adjusted by the bending module 220, the other end of the link 210 slidably moves on the link bracket 230, so that a natural curved surface of the display module 150 can be implemented.

The bending module 220 may include a moving block 221 connected to one end of the link 210 and movable forward and backward, a guide shaft 222 for guiding the moving block 221 to move forward and backward without moving in the horizontal direction, and a module bracket 228 for receiving the bending module 220.

The link 210 is rotatably coupled to the link fixing unit 215 extending from the bending module 220. The link 210 may rotate around the link fixing pin 213 fastened to the link fixing unit 215, and one end and the other end of the link 210 may move in opposite directions.

When the user pulls the horizontal ends SS1 and SS2 of the main body 100' in a forward direction, the bending module 220 may allow the other end of the link 210 located on the horizontal ends SS1 and SS2 of the main body 100' to move in a forward direction, the link 210 may rotate around the link fixing pin 213, and one end of the link 210 may move in a backward direction.

In contrast, when the user pushes the horizontal ends SS1 and SS2 of the main body 100' in a backward direction so as to use the display device as a flat display, the other end of the link 210 may move backward and one end of the link 210 may move forward. A coupling position of the link fixing pin 213 may be located closer to one end of the link 210 than the other end of the link 210, and the movement distance of one end of the link 210 may be shorter than the movement distance of the other end of the link 210.

As described above, the user may manually change the curvature of the display device 100 by applying force to the horizontal ends SS1 and SS2 of the main body 100. At this time, the pair of links 210 is synchronized with the bending module 220 and simultaneously moved. As a result, the other side SS2 can also move at the same time when the user pulls or presses one side SS1 of the main body 100'.

However, according to the manual driving method, the user may apply force directly to the display module 150, there is a high risk of damage to the display module 150, and a motor is provided in the bending module 220, so that the curvature of the display module 150 can be changed.

For example, the guide shaft 222 may be formed in a spiral shape, and a spiral groove corresponding to the spiral of the guide shaft 222 may be formed in the moving block 221. When the motor rotates the guide shaft 222, the moving block 221 may move forward and backward.

When the moving block 221 of the bending module 220 moves backward, one end of the link 210 coupled to the moving block 221 moves backward, the other end of the link 210 moves forward, and the angle of the pair of links 210 may vary. The bending module 220 may induce a change in the angle of the links 210, and the display module 150 may again transition to the bent state or the flat state.

The display device 100 may further include a back cover 103 for covering the bending module 220 and the controller, and may further include a stand 260 for holding the main body 100' of the display device 100 on the floor. Instead of the stand 260, the display device 100 may further include a wall bracket that can be installed on the wall, and the stand 260 and the wall bracket may be coupled to the back cover 103.

Figure 6:
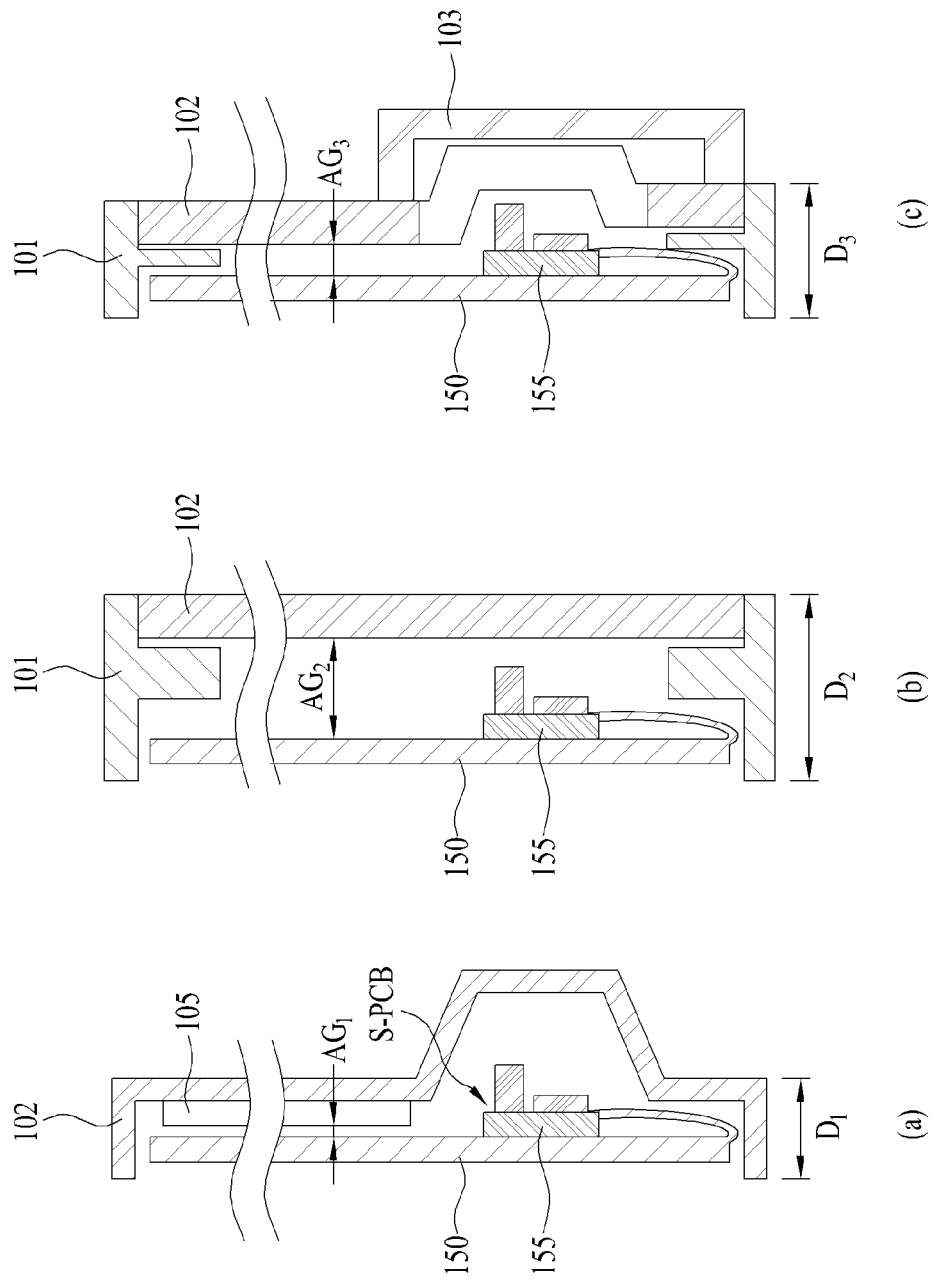
FIG. 6 is a cross-sectional view of a conventional display device.

FIG. 6 is a cross-sectional view of a conventional display device 100. (a) is a cross-sectional view of a conventional flat display device 100. In consideration of proportions of the drawings, a middle portion is omitted and only an upper portion and a lower portion are shown.

The display module 150 may include a drive IC 155 for controlling each pixel by transmitting a signal thereto, and may be connected to the drive IC 155 through a flexible substrate. In order to reduce a size of a bezel, the drive IC 155 may be positioned on the rear surface of the display module 150, and the display module 150 and the drive IC may be connected to each other using the flexible substrate.

The drive IC 155 may be generally located in a lower portion of the rear surface of the display module 150 and may protrude from the rear surface of the display module 150 because the driver IC 155 includes an IC.

Therefore, the cover bottom 102 may have a shape that only a position corresponding to the drive IC 155 protrudes in the backward direction as shown in (a) in FIG. 6, and may even omit a middle cabinet 101 (see FIG. 7) that extends in the forward direction from ends of the cover bottom 102 to cover a lateral perimeter of the cover bottom 102.

Although it is relatively easy to dissipate heat as a gap between the display module 150 and the cover bottom 102 is narrow, a heat dissipation member 105 may be further interposed between the display module 150 and the cover bottom 102 to more effectively dissipate the heat of the display module 150.

However, it is difficult for the cover bottom 102 in a form in which the rear surface and the side surfaces are connected to each other as shown in (a) to be bent, so that it is not possible to implement a bendable display device 100. In addition, because the protrusion for covering the drive IC is formed on the rear surface of the cover bottom 102, it is difficult to implement a clean design without any unnecessity on the rear surface.

A display device 100 of a design as shown in (b) in FIG. 6 may place the cover bottom 102 rearwardly as much as the drive IC 155 protrudes rearwards for a flat rear surface. As the cover bottom 102 is moved to implement the flat rear surface and the middle cabinet 101 that surrounds the side surfaces is independently disposed, the display device 100 may be constructed such that the main body 100' is able to be bent.

However, a separation distance AG2 between the display module 150 and the cover bottom 102 is greater than a separation distance AG1 in the embodiment of (a), so that there is a problem that it is difficult to dissipate the heat of the display module 150.

For the heat dissipation, a heat source with high thermal conductivity, such as a metal, must be placed in close contact with or close to the member. When the gap is large, the heat is trapped in air in the gap, making it difficult to dissipate the heat. When the heat dissipation is not performed smoothly, a temperature of the display device 100 may rise, which may cause a product failure.

As in the embodiment of (a), a heat conducting member 105 for the heat dissipation may be added between the display module 150 and the cover bottom 102, but there is a problem in that a material cost increases and a weight increases because the gap between the display module 150 and the cover bottom 102 is large. In addition, because a heat conduction distance is large, a heat dissipation efficiency is not high, and the bending is difficult due to the thickness.

In order to implement the bendable display device 100, a cover bottom 102 having a thickness smaller than that of the cover bottom 102 of the display device 100 having the flat structure may be used, but there is a problem that the cover bottom 102 weakens rigidity of the display device 100.

In particular, because a corner of the display module 150 is the most vulnerable, the display device 100 has to pass a corner bending test in which a crack occurs by applying a predetermined force to the corner. When the thickness of the cover bottom 102 is small, the crack occurs under a low load during such corner bending test, which does not meet product quality standards.

(c) in FIG. 6 is an embodiment derived by combining the configurations of (a) and (b) in FIG. 6. The first middle cabinet 101 used in the embodiment of (b) may be applied, and a display device 100 in (c) in FIG. 6 may have an upper portion with a gap between the display module 150 and the cover bottom 102 that is small as shown in (a) (AG3<AG2).

A portion of the cover bottom 102 corresponding to the drive IC 155 at a lower portion protrudes in the backward direction. The protruding portion may be exposed on the rear surface as in the embodiment of (a), or may be covered with the back cover.

When also using the thin cover bottom 102 so as to be bendable in the embodiment of (c), the rigidity problem remains as in the embodiment of (b). In addition, as in (a), it is difficult to implement the flat rear surface. In addition, because the first middle cabinet 101 is thin, the first middle cabinet 101 is difficult to be manufactured and is likely to be damaged.

Figure 7:
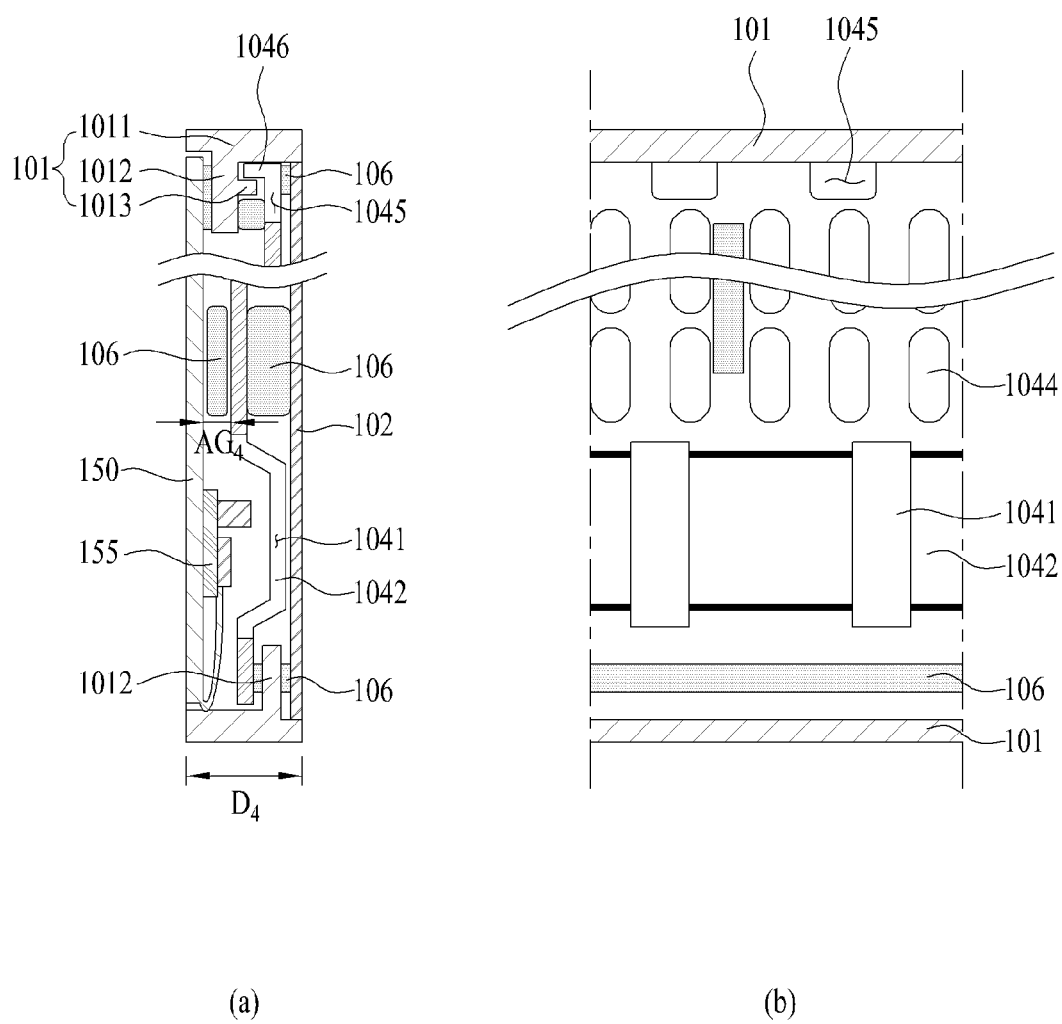
FIG. 7 is a view illustrating a first embodiment of a display device.
Figure 8:
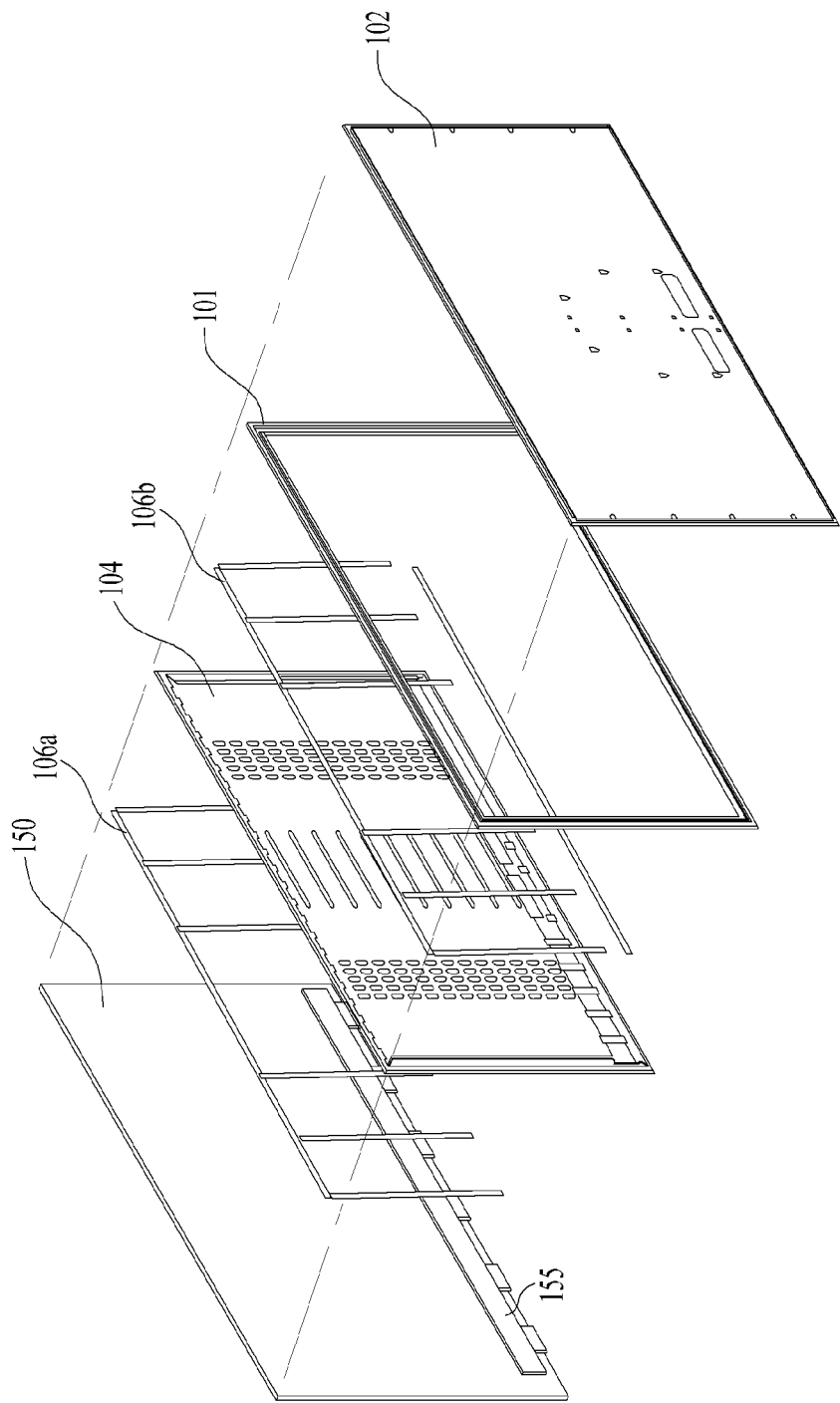
FIG. 8 is an exploded perspective view of a main body of a display device.

FIG. 7 shows a cross-sectional view showing an example of the display device 100 and a view showing an inner sheet 104, and FIG. 8 is an exploded perspective view of the main body 100' of the display device 100.

The display device 100 of the present disclosure further includes the inner sheet 104 between the cover bottom 102 and the display module 150 and independently includes the middle frame 101 to solve the heat dissipation problem and the rigidity problem, and at the same time, realize the flat rear surface structure.

A cross-section of the display device 100 may have different shapes of four sides, and in particular, may have different configurations of the four sides when having the bendable shape as in the present disclosure. However, configurations on left and right sides may have a symmetrical structure, and configurations on upper and lower sides may be similar in terms of being bent with the same curvature even when there are differences in some components.

The middle cabinet constituting the side surfaces of the display device 100 may be divided into each first middle cabinet 101 at each of upper and lower portions and each second middle cabinet 108 (see FIG. 14) at each of side portions because there is a difference in a shape change.

When the display device 100 is bent, the first middle cabinet 101 changes in a curvature and the second middle cabinet 108 is not bent, so that the first middle cabinet 101 and the second middle cabinet 108 may have different materials and structures.

A description of FIGS. 7 to 11 will be made based on a vertical cross-section of the display device 100 and will be made based on the first middle cabinet 101 at the upper portion.

In order to implement the bendable display device 100, one without a backlight, such as an LED or an OLED that is bendable must be used as the display module 150, and the structures 102 and 104 for covering the rear surface of the display module 150 must also be bendable.

The display device 100 of the present disclosure is characterized in that the middle cabinet 101 for covering the side surfaces and the cover bottom 102 for covering the rear surface are constructed as separate members to realize the bendable shape, and the inner sheet 104 is further disposed.

The display device 100 of the present disclosure may include the display module 150 for outputting the image, the inner sheet 104 positioned on the rear surface of the display module 150, and the cover bottom 102 constituting the rear surface of the main body 100' of the display device 100. In addition, the display device 100 may include the middle cabinet 101 located around side surfaces of the display module 150, the inner sheet 104, and the cover bottom 102 and forming a side appearance of the main body 100'.

As shown in (a) in FIG. 7, the inner sheet 104 is located adjacent to the rear surface of the display module 150 to reduce a size of a gap AG4 to prevent stagnation of the heat. It is advantageous in terms of the heat dissipation when the size of the gap between the inner sheet 104 and the display module 150 is smaller than that of a gap between the inner sheet 104 and the cover bottom 102.

In addition, the inner sheet 104 may also be made of a metal material with the high thermal conductivity to obtain the heat dissipation effect.

A first region 1042, which is a portion of the inner sheet 104 corresponding to the drive IC 155, may protrude in the backward direction to avoid interference with the drive IC 155. Instead, in the display device 100 of the present disclosure, the cover bottom 102 covers the inner sheet 104 while forming the flat surface, so that the first region irregularity 1042 of the inner sheet 104 does not affect the appearance design.

Figure 9:
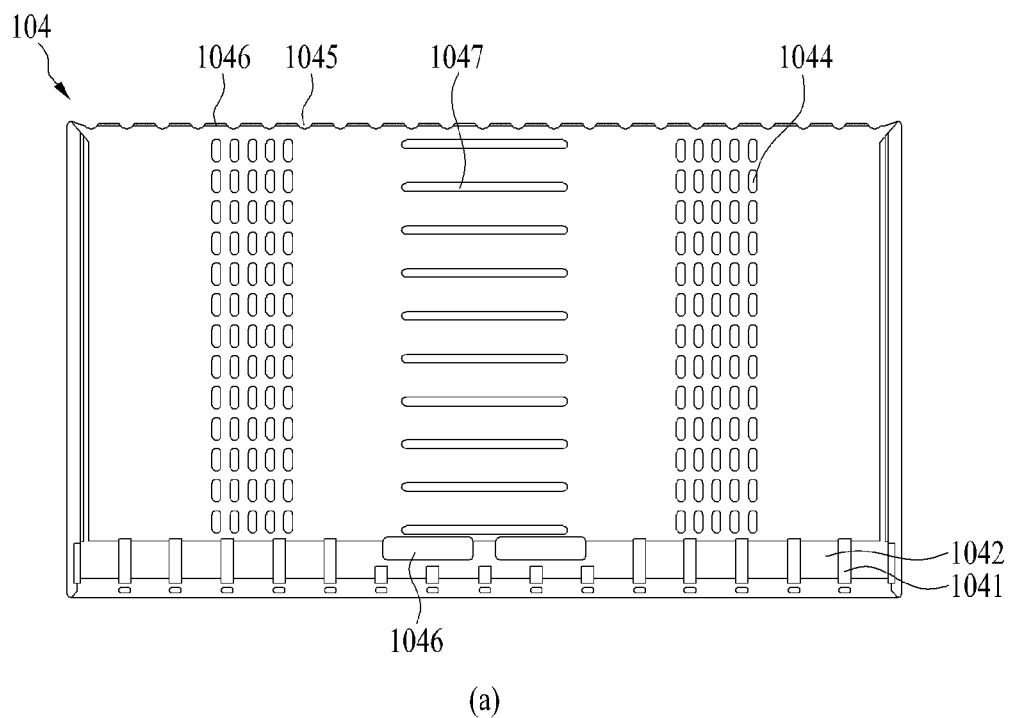
FIG. 9 is a view illustrating an inner sheet of a display device.
Figure 9:
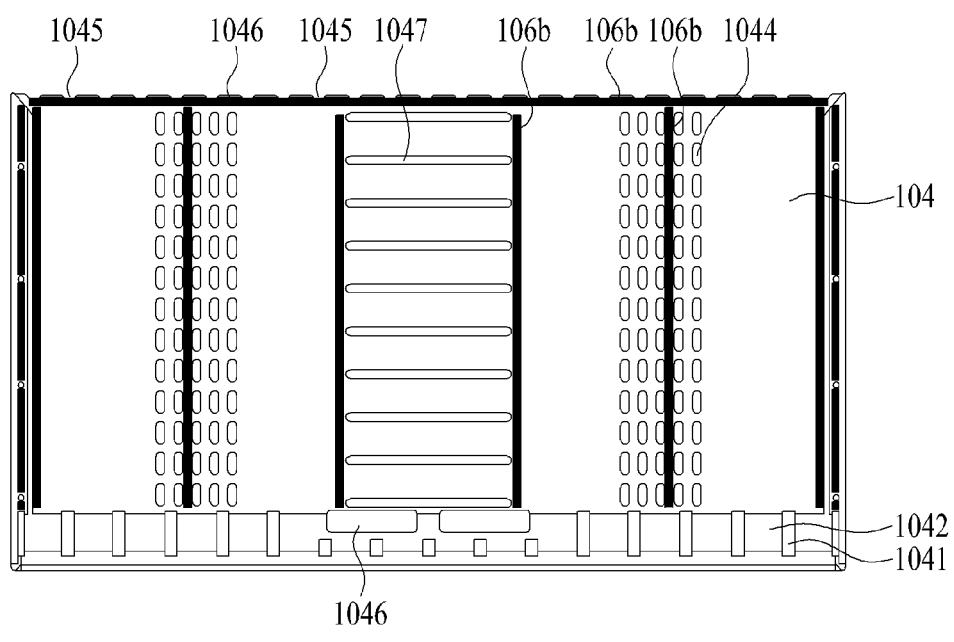

When the irregularity is formed, the first region 1042 increases in rigidity, but is difficult to be bent instead. When a plurality of first holes 1041 spaced apart from each other in a horizontal direction are defined in the first region 1042 as shown in FIG. 9, the inner sheet 104 may be bent as the first hole 1041 is widened corresponding to a curvature of the main body 100'.

The members 150, 101, 102, and 104 may be attached to each other using a double-sided adhesive tape 106. Some of the members may be fastened to each other using a fastener such as a screw and the like, but the use of the fastener may be restricted to realize the display device 100 that is thin and minimizes the visible fasteners.

Because the display module 150 and the inner sheet 104 are light, the display module 150 and the inner sheet 104 may maintain the attached state without being detached with the fasteners of the limited number and an adhesive force of the adhesive tape 106.

The adhesive tapes 106 are located between the display module 150 and the inner sheet 104 and between the inner sheet 104 and the cover bottom 102, respectively, and the adhesive tape 106 has a predetermined elasticity when a curvature is changed, so that the adhesive tape 106 may compensate for a slip between the members resulted from a difference in a radius of curvature.

When the adhesive tape 106 extends long in the horizontal direction, an error resulted from the slip is accumulated, and thus, an amount of deformation increases at an end thereof, so that an adhesive tape 106 having a long shape in the vertical direction as shown in FIG. 6 may be used.

Thicknesses of the adhesive tapes 106 respectively positioned on the front and rear surfaces of the inner sheet 104 may be different based on the separation distance between the inner sheet 104 and the display module 150 and the separation distance between the inner sheet 104 and the cover bottom 102.

As shown in (a) in FIG. 7, the inner sheet 104 may be disposed to be biased toward the display module 150 except where the drive IC 155 is located. Accordingly, the thickness of the first adhesive tape 106 positioned on the front surface of the inner sheet 104 may be smaller than the thickness of the second adhesive tape 106 positioned on the rear surface.

FIG. 9 is a view illustrating the inner sheet 104 of the display device 100, (a) illustrates the inner sheet 104 before the adhesive tape 106 is attached, and (b) shows the state in which the adhesive tape 106 is attached. The inner sheet 104 of the present disclosure uses a material that is light while having rigidity such as aluminum, thereby securing the rigidity.

When the cover bottom 102 is thickened to secure the rigidity, the bending becomes difficult. When the display rear surface structure is composed of two sheets of the inner sheet 104 and the cover bottom 102 as in the present disclosure, the bending is possible while securing the rigidity.

Because the inner sheet 104 and the cover bottom 102 are attached to each other using the adhesive tape 106 with the elasticity, the bending may be performed easily as the slip occurs within a certain range during the bending.

When the display device 100 is bent, an amount of deformation increases in directions from a central portion thereof in the horizontal direction to left and right ends thereof. Thus, a circuit board as the controller 180, the bending module 220 for the bending, and the stand for mounting the display device 100 may be coupled at the central portion.

In this regard, a fastener for fastening the controller 180 and the bending module 220 may penetrate the cover bottom 102 to fasten the inner sheet 104, thereby increasing a support force.

In order to increase rigidity of a second region located at a center in the horizontal direction of the inner sheet 104, a bead 1047 may be formed. The bead 1047, which is formed by pressing and processing a plate-shaped member, may increase the rigidity of the inner sheet 104, but becomes a design hindrance factor when being exposed to the outside. Because the inner sheet 104 is covered by the cover bottom 102, even when the bead 1047 is molded, the design is not affected.

Left and right ends of the inner sheet 104 with little or no deformation may reinforce the rigidity by performing folding processing. The folded portions of the inner sheet 104 may be fastened to the cover bottom 102 with the screw or the like. Because the thickness of the inner sheet 104 increases in the folded portion, the adhesive tape 106 that is thinner than those in other regions may be used.

Portions on left and right sides of the center (the second region) in the horizontal direction of the inner sheet 104 are portions where the deformation occurs during the bending. A plurality of second holes 1044 may be defined to compensate for a difference in a length resulted from a difference in the radius of curvature between the display module 150 and the cover bottom 102 during the bending.

The second holes 1044 may be uniformly defined above the first region 1042 such that the deformation may be achieved in a balanced manner throughout the entire area of the inner sheet 104. The second holes 1044 may be evenly defined in the vertical direction except for the first region 1042 in which the first holes 1041 are already defined. The plurality of second holes 1044 may be arranged in the horizontal direction to sufficiently receive the deformation in the horizontal direction.

An area in which the second holes 1044 are defined in the horizontal direction may vary depending on a size and a degree of bending of the display device 100. The second holes 1044 may be symmetrically defined on the left and right sides such that the deformation on the left and right sides are balanced.

An opening 1046 through which a cable for connecting the drive IC 155 located in front of the first region 1042 to the controller located on the rear surface of the cover bottom 102 passes may be included, and the opening 1046 may be defined at the central portion. The cover bottom 102 may also include an opening at the same position, and the cable may be connected to the controller seated on the rear surface of the cover bottom 102.

A member having rigidity such as metal may cause damage and plastic deformation during the bending when being used for the first middle cabinet 101, so that the first middle cabinet 101 may be composed of an injection-molded product that may be deformed within a predetermined range.

The first middle cabinet 101 may include an exposed portion 1011 for covering the lateral perimeter and a fastening portion 1012 extending inwardly. The fastening portion 1012, which is a member for fixing the first middle cabinet 101 by being coupled with the inner sheet 104 and the cover bottom 102, may be located between the inner sheet 104 and the cover bottom 102 or located on the front surface of the inner sheet 104.

The fastening portion 1012, the inner sheet 104, and the cover bottom 102 may be fastened with each other using the adhesive tape 106, and may be fastened by molding a first hook 1013 positioned at an end of the fastening portion 1012 and molding a second hook 1046 by bending an end of the inner sheet 104 to increase a fastening force. When the second hook 1046 continuously extends, the second hook 1046 may interfere with the bending of the inner sheet 104, so that a slit may be defined at a top of the inner sheet 104.

As shown in (a) in FIG. 7, the upper fastening portion 1012 may be positioned on the front surface of the inner sheet 104, and the lower fastening portion 1012 may be positioned between the inner sheet 104 and the cover bottom 102. When being located on the front surface of the inner sheet 104, in order to secure the fastening force with the cover bottom 102, the fastening portion 1012 may be fastened to the cover bottom 102 exposed through the top slit defined in the inner sheet 104 with the adhesive tape 106.

However, when the fastening portion 1012 is located on the front surface of the inner sheet 104 as shown in (a) in FIG. 7, because both the inner sheet 104 and the cover bottom 102 are metal, a coefficient of thermal expansion is high. When both the inner sheet 104 and the cover bottom 102 expand when an ambient temperature changes, the adhesive tape 106 for attaching the fastening portion 1012, the inner sheet 104, and the cover bottom 102 may be detached.

Figure 10:
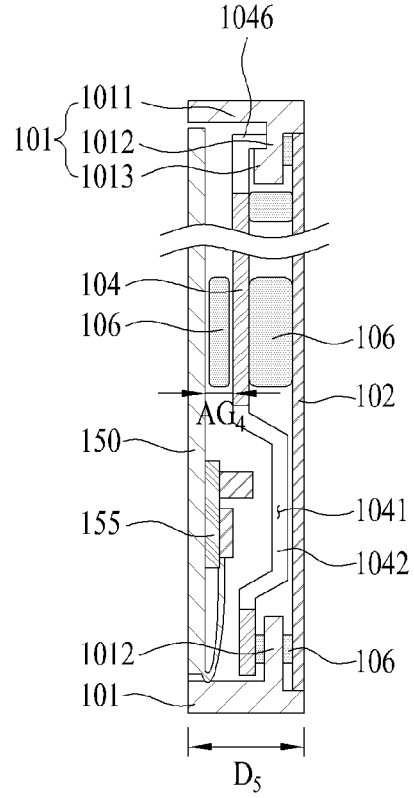
FIG. 10 is a cross-sectional view illustrating a second embodiment of a display device.
Figure 10:
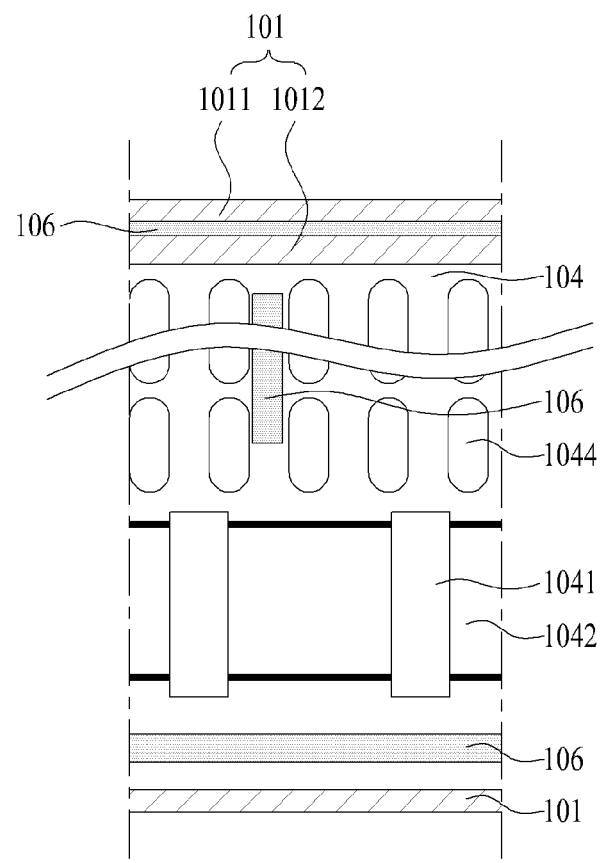
Figure 11:
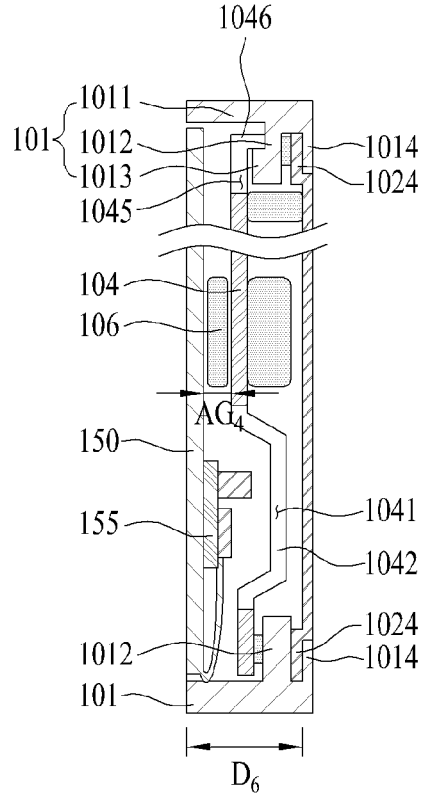
FIG. 11 is a cross-sectional view illustrating a third embodiment of a display device.
Figure 11:
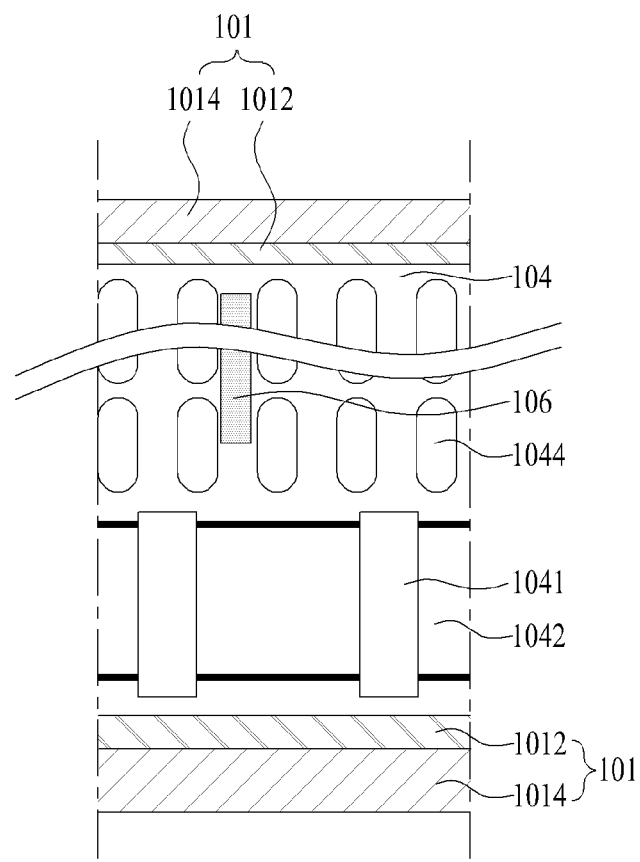

FIGS. 10 to 11 are views illustrating other embodiments of the display device 100. In order to solve the above-mentioned problem, the fastening portion 1012 may be disposed between the inner sheet 104 and the cover bottom 102 as shown in FIG. 10. A symmetrical sandwich structure may be made by placing the fastening portion 1012, which is made of an injection-molded product, between the inner sheet 104 and the cover bottom 102, which are made of the metal. Because of the symmetrical structure, a phenomenon in which only one side is severely deformed by thermal expansion does not appear, so that the adhesive tape 106 may be prevented from being detached.

For greater fastening force, as shown in FIG. 11 a third hook 1014 surrounding the cover bottom 102 may be formed at a rear end of the exposed portion 1011 of the first middle cabinet 101. The third hook, which is a portion exposed on the rear surface of the main body 100', may have a continuous surface, and the cover bottom 102 and a rear surface of the third hook may be flush with each other by bending an end (a fourth hook 1024) of the cover bottom 102 in the forward direction and positioning the fourth hook 1024 between the third hook 1014 and the fastening portion 1012.

In this regard, a slit may be defined between the fastening portion 1012 and the bent fourth hook 1024 in consideration of the plastic deformation of the cover bottom 102, and the slit 1045 between the fastening portion 1012 and the bent fourth hook 1024 may be covered with the third hook 1014 and may not be exposed to the outside.

The above description was made based on the vertical cross-section of the display device 100, so that the first middle cabinet 101 located at each of the upper and lower portions has been mainly described. However, a structure in the horizontal direction will be described below.

Figure 12:
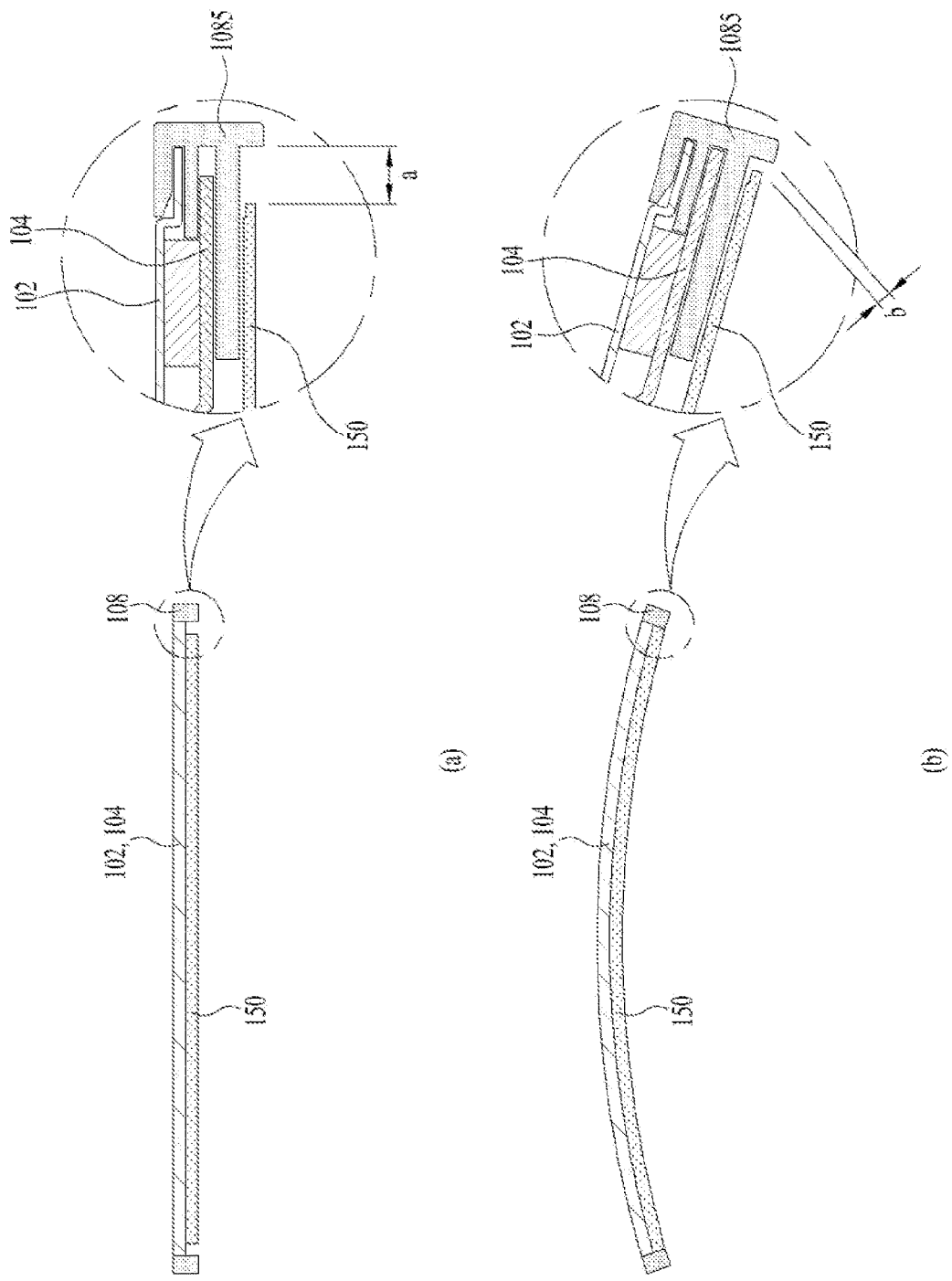
FIG. 12 is a view illustrating a first method for fastening a second middle cabinet and a display module of a display device to each other.

FIG. 12 is a view illustrating an example of a method for fastening the display module 150 and the second middle cabinet 108 of the display device 100 to each other.

The second middle cabinet 108 may be positioned at each of both ends of the display device 100 in the horizontal direction. The display device 100 may include the display module 150, the inner sheet 104, and the cover bottom 102, and the members may be coupled to each other with a predetermined gap.

The second middle cabinet 108 may include an exposed portion 1084 forming a side appearance thereof, and a plurality of ribs 1081, 1082, and 1083 extending vertically from the exposed portion 1084 and overlapping the display module 150, the inner sheet 104, and the cover bottom 102.

During the bending, the slip occurs on each member due to the difference in the radius of curvature. In particular, the display module 150 positioned inside the display device 100 that is bent as shown in (b) in FIG. 12 has a smaller length than the cover bottom 102 outwardly positioned.

That is, in order to place the end of the display module 150 in a state in which a gap b from the exposed portion 1084 of the second middle cabinet 108 is minimized when the display device 100 is bent as shown in (b) in FIG. 12, the end of the display module 150 should be disposed in a state in which a large gap a is defined between the display module 150 and the exposed portion 1084 of the second middle cabinet 108 in the flat state as shown in (a) in FIG. 12.

In this case, a size of a bezel (a section from the end of the display module 150 to the end of the display device 100) positioned at the perimeter of the display module 150 is large in the flat state. In particular, there is a difference in a size between an upper portion of the bezel and left and right portions of the bezel, making it impossible to provide a unified appearance.

In the flat state as shown in (a) in FIG. 12, there is a problem in that a step formed by the gap between the horizontal end of the display module 150 and the second middle cabinet 108 divides a portion of the bezel in the horizontal direction into two portions, which makes the bezel more visible.

The second middle cabinet 108 may further include a front rib (not shown) for covering the lateral end of the display module 150 such that the step is not formed. However, such component increases the size of the bezel even in a bent state, so that a bezel-less design is not able to be implemented.

Figure 13:
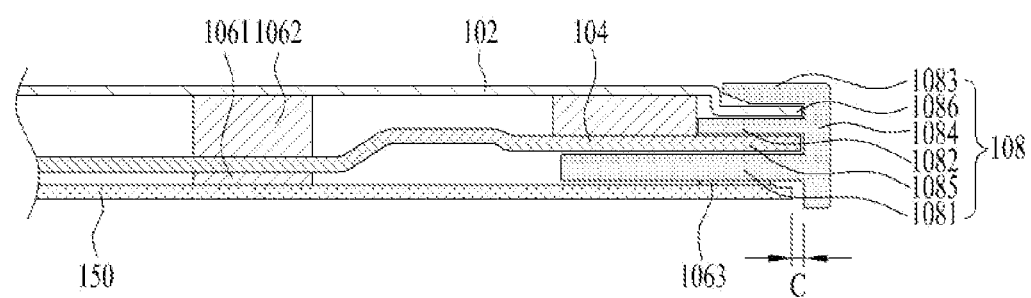
FIG. 13 is a view illustrating a second method for fastening a second middle cabinet and a display module of a display device to each other.
Figure 13:
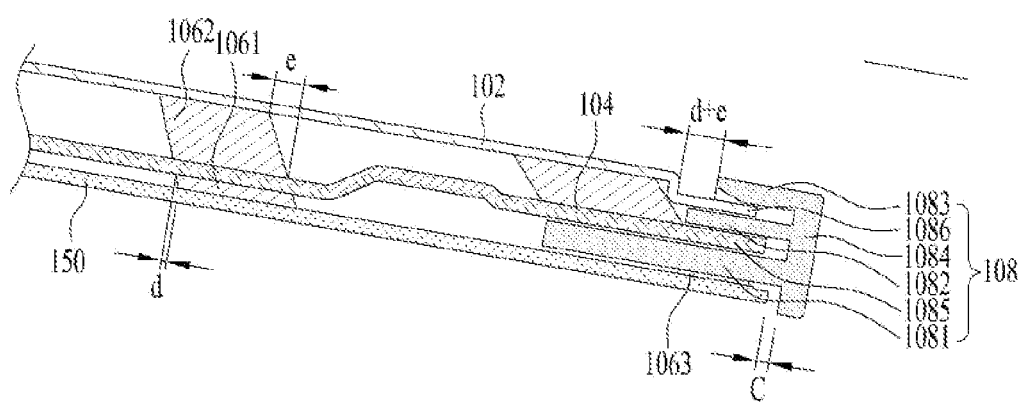

FIG. 13 is a view illustrating another embodiment of a method for fastening the second middle cabinet 108 and the display module 150 of the display device 100 to each other.

It is possible to prevent the phenomenon in the embodiment in FIG. 12 in which the display module 150 positioned on the front surface of the display device 100 is slipped and the size of the bezel on the front surface is changed. Because the size of the left and right portions of the bezel is constant, it is possible to provide an appearance unified as a whole.

The second middle cabinet 108 may include an exposed portion 1084 exposed to the outside and forming a side appearance thereof, and a plurality of ribs 1081, 1082, and 1083 extending vertically from the exposed portion 1084 and overlapping the display module 150, the inner sheet, and the cover bottom 102.

In the ribs 1081, 1082, and 1083, a first rib 1081, a second rib 1082, and a third rib 1083 may be disposed to be spaced apart from each other at predetermined spacings 1085 and 1086 in the backward direction.

The display module 150 may be located on a front surface of the first rib 1081, and the horizontal end of the inner sheet 104 may be positioned in a first fastening groove 1085 defined by a gap between the first rib 1081 and the second rib 1082. The horizontal end of the cover bottom 102 may be positioned in a second fastening groove 1086 defined by the second rib 1082 and the third rib 1083.

A fastening force between the second middle cabinet 108 and the display module 50 may be secured by forming the first rib 1081 to have the greatest length, then the second rib 1082 may have the second greatest length, and then, the third rib 1083 may have the smallest length because the third rib 1083 is exposed to the outside.

The display module 150 of the present embodiment is fixed to the second middle cabinet 108, so that a gap c from the exposed portion 1084 of the second middle cabinet 108 may be constantly maintained regardless of whether the display module 150 is bent. Accordingly, in the display device of the present embodiment, the size of the left and right portions of the bezel may be kept constant in both the flat state and the bent state.

The display module 150 may be fixed to the front surface of the first rib 1081 of the second middle cabinet, and the exposed portion 1084 may protrude forwardly of the first rib 1081 by a height corresponding to a thickness of the display module 150.

However, as described above, during the bending, the slip occurs on the display module 150, the inner sheet 104, and the cover bottom 102, so that positions of an end of each component in the flat state and the bent state are different.

When the display module 150, the inner sheet 104, and the cover bottom 102 are arranged in a line in the flat state, the horizontal end of the inner sheet 104 may slip as much as d relative to the display module 150 and the horizontal end of the cover bottom 102 may slip as much as e relative to the inner sheet 104 in the bent state.

As shown in (a) in FIG. 13, in the flat state, the horizontal ends of all of the display module 150, the inner sheet 104, and the cover bottom 102 are arranged adjacent to the exposed portion 1084 of the second cabinet 108.

In addition, in the bent state as shown in (b) in FIG. 13, the horizontal end of the display module 150 is located at the outermost side, and the ends of the inner sheet 104 and the cover bottom 102 are slipped in a direction away from the exposed portion 1084 of the second middle cabinet 108.

The inner sheet 104 and the cover bottom 102 may not be fixed to the second middle cabinet 108, and may be respectively inserted into the first fastening groove 1085 and the second fastening groove 1086 to be able to slip horizontally. As a result, when the display device 100 is bent, as shown in (b) in FIG. 13, the end of the inner sheet 104 is spaced apart by d from the exposed portion 1084 of the second middle cabinet 108, and the end of the cover bottom 102 is spaced apart by d+e from the exposed portion 1084 of the second middle cabinet 108.

In order for the cover bottom 102 to maintain the state of being coupled to the second middle cabinet 108 even in the bent state, a length of the third rib 1083 located on the rear surface of the cover bottom 102 may be greater than d+e, which is the slip amount of the cover bottom 102.

The horizontal end of the cover bottom 102 may be bent in the forward direction while forming a step 1023 such that the second middle cabinet 108 and the cover bottom 102 are flush with each other in the flat state. The end of the cover bottom 102 may protrude in the forward direction while forming the step corresponding to a thickness of the third rib 1083.

The display module 150, the inner sheet 104, and the cover bottom 102 may be coupled to each other using adhesive tapes 1061 and 1062 located between the members. In order not to interfere with the slip of the inner sheet 104 and the cover bottom 102, instead of the horizontally long adhesive tapes 1061 and 1062, the vertically long adhesive tape 1061 and 1062 as shown in (b) in FIG. 9 may be used.

In addition, the adhesive tapes 1061 and 1062 may be changed to correspond to the slip amounts of the inner sheet 104 and the cover bottom 102 using a flexible material that may be deformed within a predetermined range as shown in (b) in FIG. 13.

As described above, it is necessary to reduce the gap between the display module 150 and the inner sheet 104 in order to dissipate the heat generated from the display module 150, so that a thickness of a first adhesive tape 1061 positioned between the display module 150 and the inner sheet 104 may be smaller than that of a second adhesive tape 1062 between the inner sheet 104 and the cover bottom 102.

In order to increase the fastening force between the inner sheet 104 and the cover bottom 102, the cover bottom 102 is made of the metal material and has the rigidity, so that it is difficult to secure the coupling force with only the adhesive tapes 1061 and 1062. Thus, the inner sheet 104 and the cover bottom 102 may be fastened with each other using the fastener.

Figure 14:
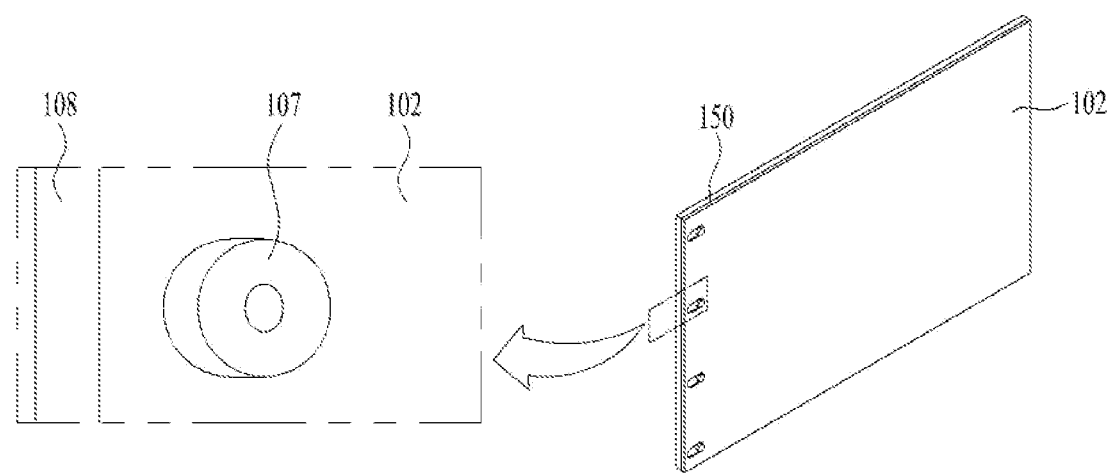
FIG. 14 is a view illustrating a method for fastening an inner sheet and a cover bottom to each other according to an embodiment in FIG. 13.
Figure 14:
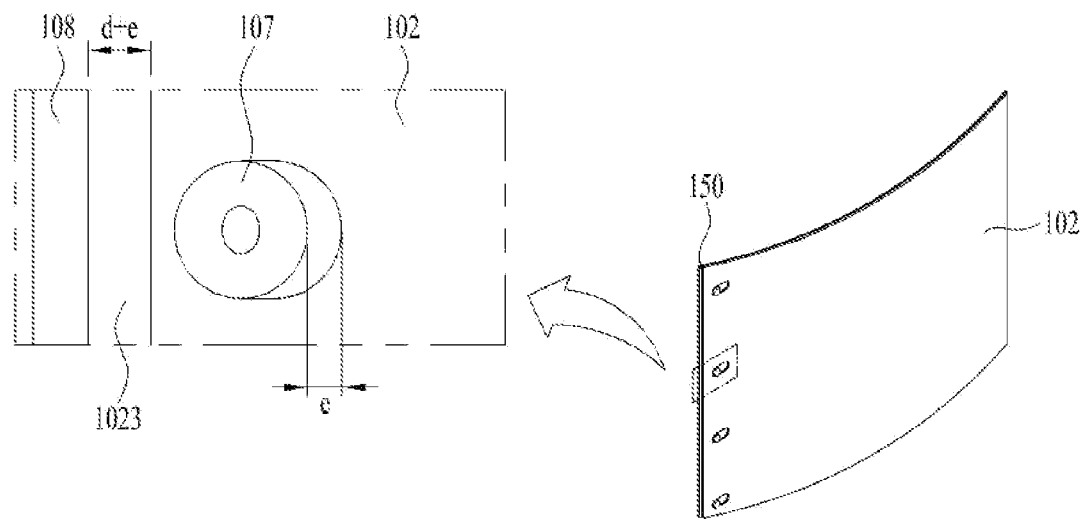

In the cover bottom, the central portion is not a problem because the slip does not occur there, but the slip occurs at the horizontal end, so that fastening structures 107 and 1027 capable of receiving such slip are required. FIG. 14 is a view illustrating a method for fastening the inner sheet 104 and the cover bottom 102 according to the embodiment in FIG. 13 to each other.

As shown in FIG. 14, a long hole 1027 that is located at the horizontal end of the cover bottom 102 and is defined long in the horizontal direction, and a fastener 107 that is fastened to the long hole 1027 and fastens the inner sheet 104 and the cover bottom 102 to each other may be included.

The fastener is located at a center of the display device 100 in the long hole 1027 in the flat state as shown in (a) in FIG. 14, and the fastener 107 slips so as to be located at an outer side of the long hole 1027 in the bent state as shown in (b) in FIG. 14. A length of the long hole 1027 may be greater in the horizontal direction by a length corresponding to a slip amount e between the inner sheet 104 and the cover bottom 102 than in the vertical direction.

Figure 15:
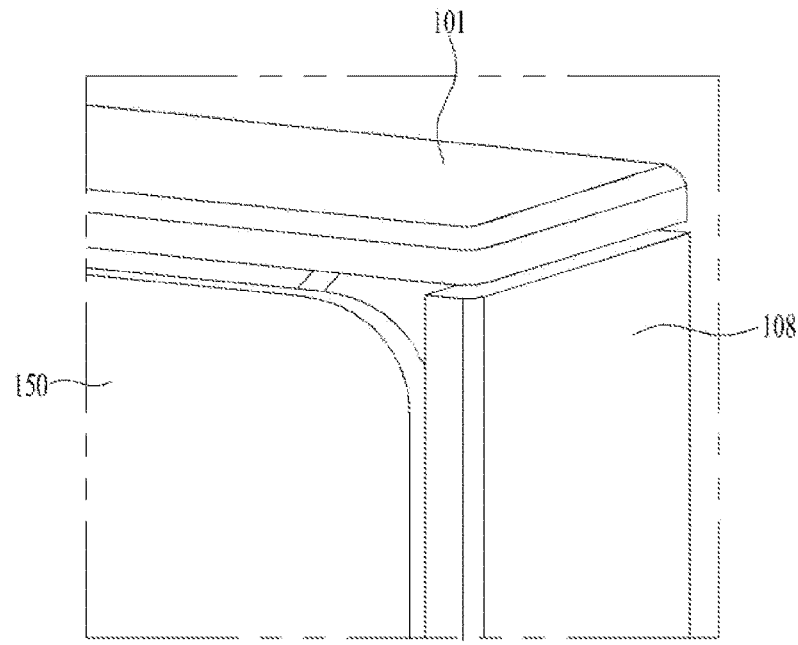
FIGS. 15 to 17 are views illustrating states of a display device according to an embodiment in FIG. 13 before and after bending.
Figure 15:
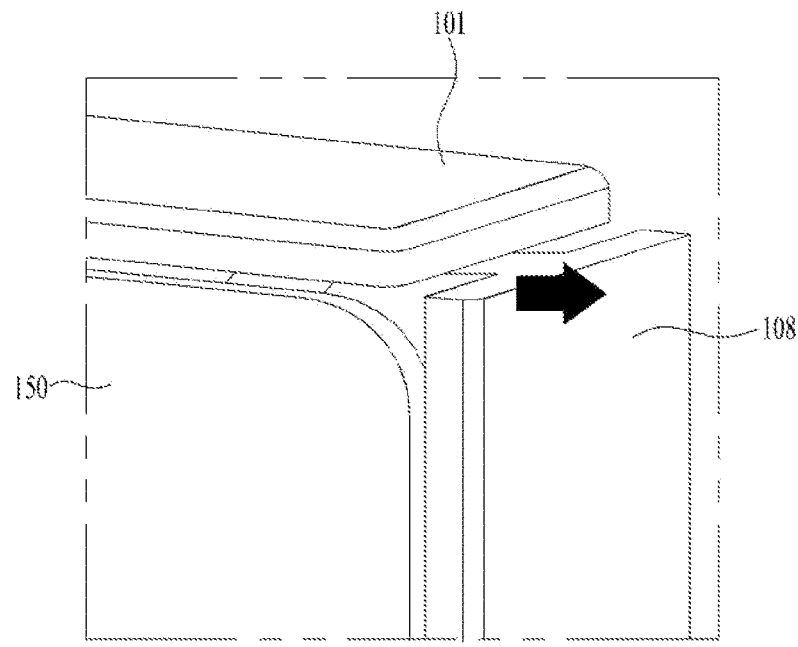
Figure 16:
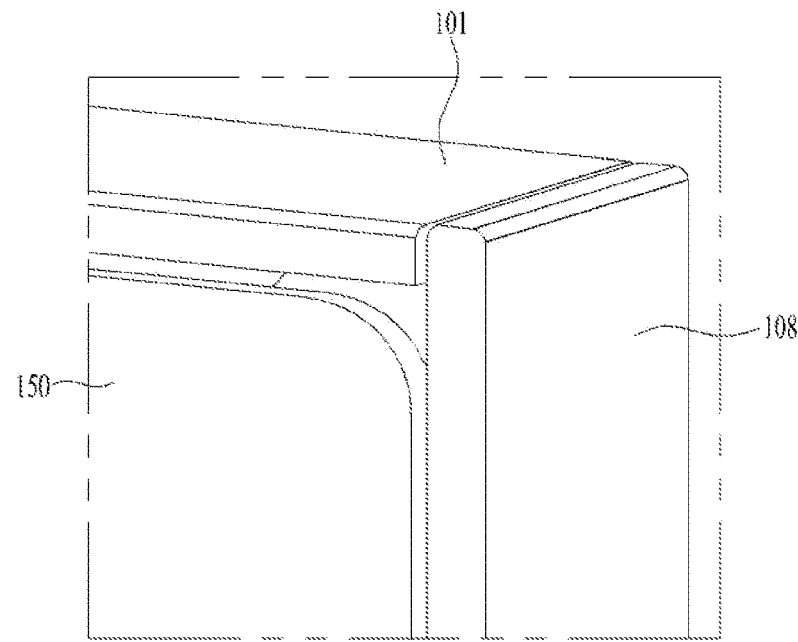
Figure 16:
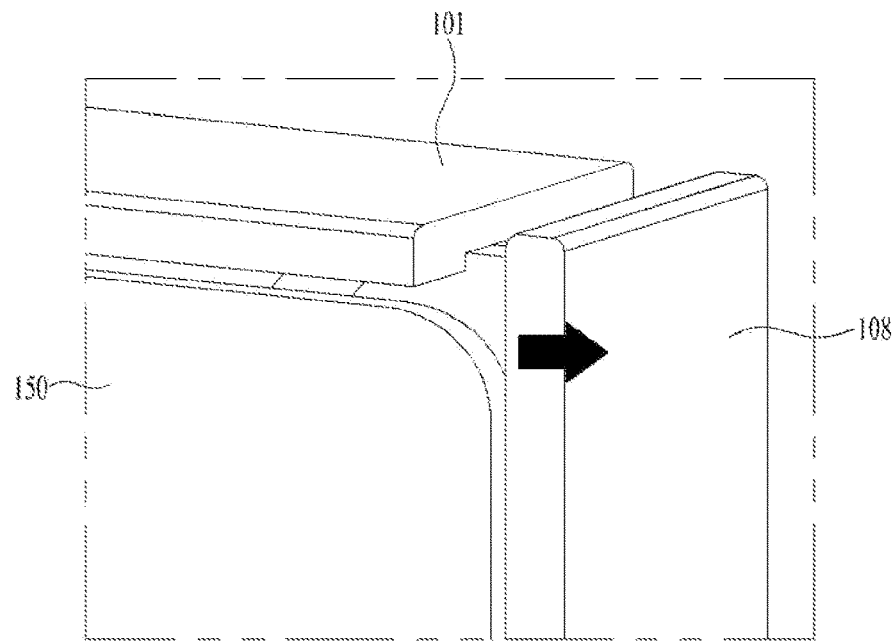
Figure 17:
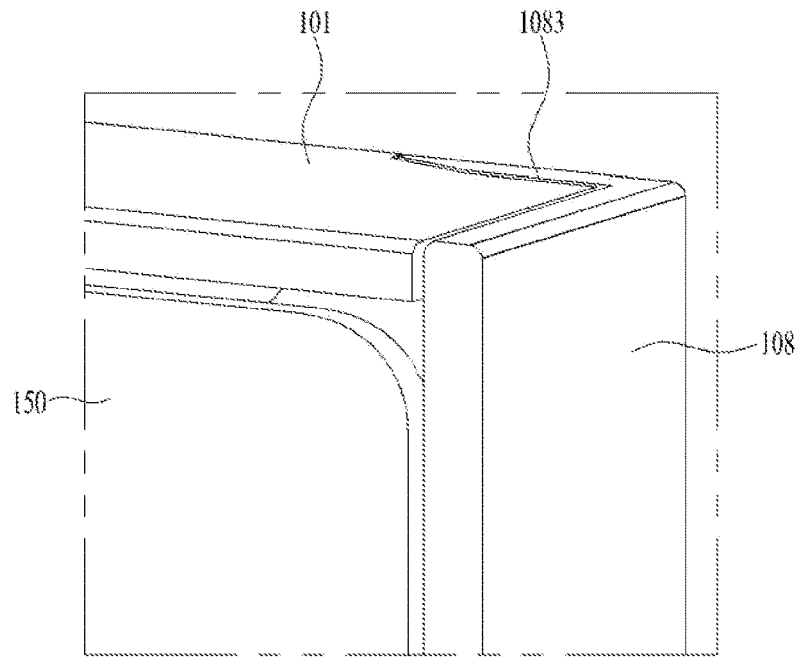
Figure 17:
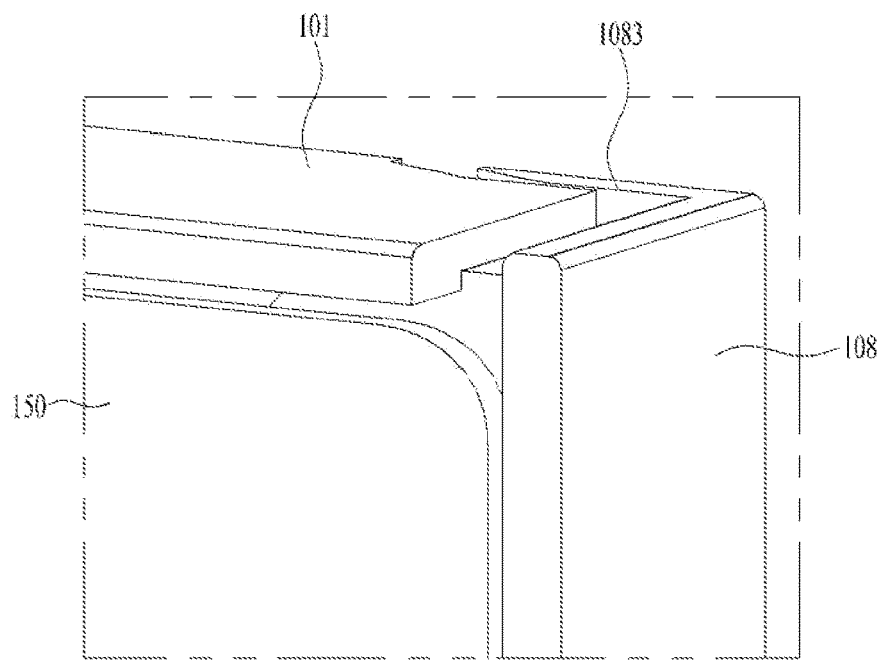

FIGS. 15 to 17 are views illustrating states of the display device 100 according to the embodiment in FIG. 13 before and after the bending. FIG. 15 is an embodiment in which a dividing line between the first middle cabinet 101 and the second middle cabinet 108 is located on the side, and FIG. 16 is an embodiment in which the dividing line is positioned on the top.

(a) shows the flat state (b) shows the bent state, and the gap between the end of the display module 150 and the second middle cabinet 108 remains unchanged in both the flat and bent states.

However, when the display device 100 is bent, a cutout between the first middle cabinet 101 and the second middle cabinet 108 may be widened, so that a shape in which a corner is dent as shown in (b) in FIG. 14 may be formed or a gap may occur along the dividing line as shown in (b) in FIG. 15.

In order to prevent such widening of the cutout, as shown in FIG. 17, the cutout of the first middle cabinet 101 and the second middle cabinet 108 may be implemented in a bent shape, so that the cutout may not be visible from the front.

By extending the above-mentioned third rib 1083 to a position overlapping with the first middle cabinet 101, the third rib 1083 may cover the gap between the first middle cabinet 101 and the second middle cabinet 108 in the bent state as shown in (b) in FIG. 16. In this regard, a groove corresponding to the third rib 1083 may be defined in a rear surface of the end of the first middle cabinet 101.

Figure 18:
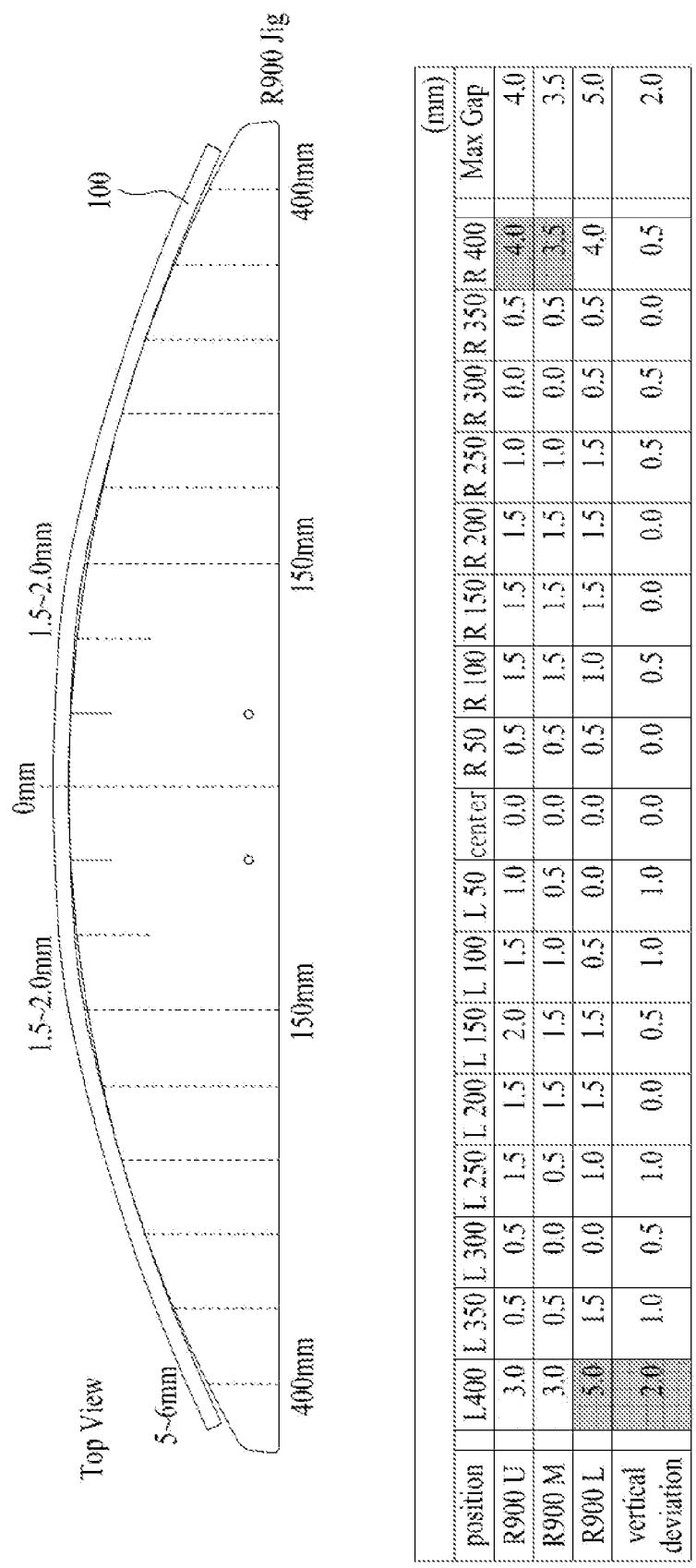
FIG. 18 is a view illustrating a method for measuring a degree of curvature matching of a display module according to an embodiment in FIG. 12.

FIG. 18 is a view illustrating a method for measuring a degree of curvature matching of the display module 150 according to the embodiment in FIG. 12. In the bent state of the display device 100, a jig corresponding to a specific curvature may be placed on the front surface of the display device, and a gap between the main body 100' of the bent display device and the jig may be measured. A large gap means that a degree of matching with a designed curvature is poor, and a curvature of the central portion of the display device 100 and a curvature of the end of the display device 100 are different.

In order to design the display device 100 to have a uniform curvature as a whole, the display module 150, the inner sheet 104, and the cover bottom 102 must be coupled to each other such that the slip of each member may occur naturally. When the fastening force between the members is too strong, the curvature becomes different from the designed curvature when the display device 100 is bent.

FIG. 18 is a table showing a gap with the jig in a bent state based on a curvature R900, which is a result of measuring the gap between the jig and the bent display device 100 at a spacing of 50 mm from the center to 400 mm in the left and right directions.

The gap appears the largest at the left and right ends. Even in a case of the same position in the horizontal direction, a difference may occur in the upper and lower portions of the display device 100. A gap at L400 mm on the left has the largest value of 5 mm, and a gap at R400 mm on the right has the largest value of 4 mm.

Figure 19:
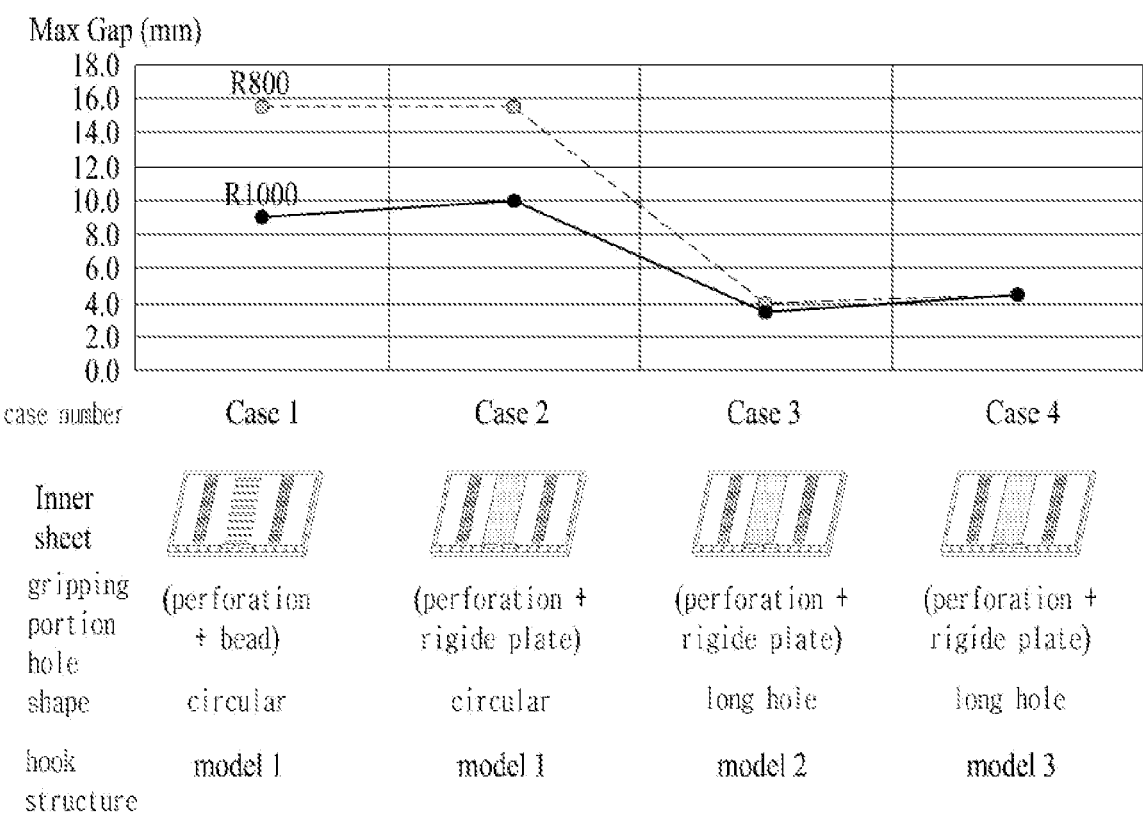
FIG. 19 is a view showing a measurement result of a degree of curvature matching by a method in FIG. 18.

In addition, a gap deviation in the vertical direction may also appear the largest at L400 mm, which is the most spaced position from the center, of 2 mm. FIG. 19 is a view showing a measurement result of the degree of curvature matching by the method in FIG. 18. A max gap indicated by the graph means the largest value among the gaps measured when the degree of matching with the jig is measured in the scheme described above.

Cases 1 and 2 are cases having a circular fastening hole to which the long hole 1027 is not applied, and Cases 3 and 4 are cases to which the long hole 1027 is applied. A difference between Cases 1 and 2 is a shape of the inner sheet 104. Cases 1 and 2 are respectively a case in which a bead is formed at the center of the inner 104 and a case in which a rigid plate is added at the center of the inner 104. In such two Cases, a structural change at the center does not significantly affect the slip.

In Cases 3 and 4 to which the long hole 1027 of the cover bottom 102 in FIG. 14 is applied, the max gap value is greatly lowered and the degree of matching is improved. The fastening using the long hole 1027 has the greatest influence on the free slip of the display module 150, the inner sheet 104, and the cover bottom 102.

As shown in FIG. 19, it may be seen that, based on R800, the large max gap equal to or greater 15 mm appears in Cases 1 and 2, and the max gap decreases to a value equal to or lower than 5 mm and the degree of curvature matching is improved in Cases 3 and 4.

The hook structures 1046 and 1013 relate to the coupling structure of the first middle cabinet 101 and the inner sheet 104 described above. A model 1 in Cases 1 and 2 means a structure in which the inner sheet 104 is coupled to the rear surface of the fastening portion of the first middle cabinet 101 as the first hook 1013 and the second hook 1046 are hooked as shown in FIG. 7, and a model 2 is a structure in which the inner sheet 104 is coupled to the front surface of the fastening portion of the first middle cabinet 101 in FIG. 10. A model 3 means an embodiment in which the first middle cabinet 101 further includes the third hook 1014 that covers the rear surface of the cover bottom 102 in FIG. 11.

The fastening structures of the first middle cabinet 101 to the inner sheet 104 and the cover bottom 102 are affected by the slip amount improvement, but the difference is not significantly large, so that the fastening structure of the first middle cabinet 101 and the inner sheet 104 may be determined in consideration of the heat dissipation and the fastening force with the inner sheet 104/the cover bottom 102.

As described above, the display device 100 of the present disclosure may deform the display module 150 into the flat state or the bent state, so that the user may use the display device 100 in a desired shape.

It is possible to provide the display device that includes the inner sheet to secure the rigidity while being bendable and is effective in terms of the heat dissipation.

In particular, it is possible to secure the constant size of the bezel without the change in the position of the display module located at the end of the display device.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

What is claimed is:

1. A display device, the display device comprising:
a display for outputting an image and having a curvature that changes in a horizontal direction;
an inner sheet disposed at a rear side of the display;
a cover bottom disposed at a rear side of the inner sheet; and
a middle cabinet for covering perimeters of the display, the inner sheet, and the cover bottom and forming a side appearance,
wherein the middle cabinet includes:
a first middle cabinet positioned on each of a top side and a bottom side of the display; and
a second middle cabinet positioned on each of a left side and a right side of the display,
wherein the display is coupled to the second middle cabinet, and the inner sheet and the cover bottom are coupled to the second middle cabinet such that end portions of the cover bottom and the inner sheet fit inside the second middle cabinet in the horizontal direction.

2. The display device of claim 1, further comprising:
a long hole extending along a lateral direction and defined in the cover bottom; and
a fastener fastened to the long hole to fasten the cover bottom with the inner sheet.

3. The display device of claim 2, wherein the long hole is defined adjacent to each of a left end and a right end of the cover bottom.

4. The display device of claim 1, wherein the second middle cabinet comprises:
a first fastening groove where a lateral end of the inner sheet is inserted; and
a second fastening groove where a lateral end of the cover bottom is inserted,
wherein, when the curvature of the display changes, a position of the inner sheet is changed in the first fastening groove and a position of the cover bottom is changed in the second fastening groove.

5. The display device of claim 4, wherein the second middle cabinet further comprises:
a first rib coupled to a lateral end of the display;
a second rib positioned at a rear side of the first rib and defining the first fastening groove with the first rib; and
a third rib positioned at a rear side of the second rib and defining the second fastening groove with the second rib,
wherein a length of the third rib is greater than a slip distance of the cover bottom.

6. The display device of claim 5, wherein the third rib extends to an upper end and a lower end of the second middle cabinet and overlaps with the first middle cabinet, wherein the first middle cabinet comprises a groove having a shape corresponding to a shape of the third rib at an end thereof.

7. The display device of claim 5, wherein the lateral end of the cover bottom is curved to form a step in a forward direction,
wherein a thickness of the step corresponds to a thickness of the third rib.

8. The display device of claim 1, further comprising:
a first adhesive tape positioned between the display and the inner sheet; and
a second adhesive tape positioned between the inner sheet and the cover bottom,
wherein a shape of the first adhesive tape and a shape of the second adhesive tape change corresponding to slip amounts of the inner sheet and the cover bottom based on the change in the curvature of the display.

9. The display device of claim 8, wherein a thickness of the first adhesive tape is smaller than a thickness of the second adhesive tape.

10. The display device of claim 1, further comprising:
a drive integrated circuit (IC) positioned on the rear side of the display,
wherein the inner sheet comprises:
a first region protruding in a backward direction at a position corresponding to the drive IC; and
a plurality of first holes defined in the first region,
wherein the plurality of first holes extend longitudinally along a vertical direction and are arranged to be spaced apart from each other in the horizontal direction.

11. The display device of claim 1, wherein, when the curvature of the display changes, a spacing between the first middle cabinet and the second middle cabinet changes.

12. The display device of claim 1, wherein the first middle cabinet is fastened with the inner sheet.

13. The display device of claim 12, wherein the first middle cabinet comprises:
an exposed portion exposed on a lateral perimeter of the cover bottom; and
a fastening portion extending inwardly from the exposed portion and comprising a first hook,
wherein the inner sheet comprises a second hook coupled with the first hook at an upper end.

14. The display device of claim 1, further comprising:
a moving block located at a center of a rear side of the cover bottom;
a pair of links respectively extending along a left and a right direction, wherein each link has one end coupled to the moving block; and
a pair of link brackets respectively positioned at a left end and a right end of the cover bottom, wherein an other end of the link is connected to each link bracket,
wherein, when an angle between the pair of links changes, curvatures of the display, the inner sheet, and the cover bottom change.

15. The display device of claim 1, wherein the display comprises an organic light emitting diode panel.

* * * * *